(12) United States Patent
Train

(10) Patent No.: US 8,989,046 B1
(45) Date of Patent: Mar. 24, 2015

(54) INTER-DOMAIN ROUTING MESSAGE DISTRIBUTION THROUGH WIDE AREA BROADCAST CHANNEL

(71) Applicant: The Aerospace Corporation, El Segundo, CA (US)

(72) Inventor: Joshua Train, El Segundo, CA (US)

(73) Assignee: The Aerospace Corporation, El Segundo, CA (US)

( * ) Notice: Subject to any disclaimer, the term of this patent is extended or adjusted under 35 U.S.C. 154(b) by 235 days.

(21) Appl. No.: 13/674,124

(22) Filed: Nov. 12, 2012

(51) Int. Cl.
*H04L 12/28* (2006.01)
*H04L 1/00* (2006.01)
*H04L 12/26* (2006.01)
*H04L 12/56* (2006.01)
*H04L 12/751* (2013.01)

(52) U.S. Cl.
CPC ..................................... *H04L 45/02* (2013.01)
USPC ....... 370/254; 370/392; 370/395.31; 370/252

(58) Field of Classification Search
CPC ......... H04L 41/12; H04L 45/02; H04L 47/10; H04L 43/50; H04L 45/00; H04L 29/0653; H04L 12/5601; H04L 45/54
USPC .......... 370/254, 252, 389, 392, 395.3, 395.31
See application file for complete search history.

(56) References Cited

U.S. PATENT DOCUMENTS

| | | | |
|---|---|---|---|
| 7,330,474 B2 | 2/2008 | Moon et al. | |
| 7,346,771 B2 | 3/2008 | Narayanan | |
| 7,349,994 B2 | 3/2008 | Balonado et al. | |
| 7,359,393 B1 | 4/2008 | Nalawade et al. | |
| 7,468,956 B1 | 12/2008 | Leelanivas et al. | |
| 7,502,332 B1 | 3/2009 | Chen | |
| 7,529,239 B2 | 5/2009 | Seppaenen | |
| 7,529,254 B2 | 5/2009 | Tsuge et al. | |
| 7,532,631 B2 | 5/2009 | Raszuk et al. | |
| 7,539,191 B1 | 5/2009 | Jacobson et al. | |
| 7,626,948 B1 | 12/2009 | Cook et al. | |
| 7,656,857 B2 | 2/2010 | Thubert et al. | |
| 7,675,912 B1 | 3/2010 | Ward et al. | |
| 7,693,069 B2 | 4/2010 | Hao et al. | |
| 7,701,940 B2 | 4/2010 | Novello et al. | |
| 7,739,404 B2 | 6/2010 | Li | |
| 7,823,202 B1 | 10/2010 | Nucci et al. | |
| 7,953,103 B2 | 5/2011 | Raza | |
| 8,036,139 B2 | 10/2011 | Kouvelas | |
| 8,107,484 B2 | 1/2012 | Xu | |
| 8,121,136 B2 | 2/2012 | Asati et al. | |
| 2004/0165604 A1 | 8/2004 | Oh et al. | |
| 2005/0050225 A1 | 3/2005 | Tatman | |
| 2008/0069023 A1* | 3/2008 | Rubin | 370/312 |
| 2008/0101214 A1 | 5/2008 | Jitsukawa et al. | |
| 2008/0220771 A1* | 9/2008 | Agarwal et al. | 455/428 |
| 2009/0161578 A1 | 6/2009 | Yeung et al. | |
| 2010/0008231 A1 | 1/2010 | Retana et al. | |
| 2010/0172302 A1* | 7/2010 | Dunk | 370/328 |
| 2011/0090843 A1 | 4/2011 | Ramanujan et al. | |

* cited by examiner

*Primary Examiner* — Ronald Abelson
(74) *Attorney, Agent, or Firm* — Leonard Patel LLC

(57) ABSTRACT

An architecture for distributing routing updates via a broadcast channel is disclosed. A routing fountain ("RF") is configured to receive routing information updates. The routing information updates include network addressing information, changes to a routing structure of a network, or general information regarding the network. One or more routing fountain subscriber ("RFS") nodes are configured to send routing information updates to the RF and receive routing information updates from a routing distribution channel ("RDC"). Broadcast equipment is configured to receive routing information updates from the RF and broadcast the received routing information updates to the one or more RFS nodes via the RDC.

33 Claims, 19 Drawing Sheets

Existing Inter-Domain Routing Network.

Inter-Domain Network augmented With Routing Fountain Nodes Connected to existing network Through $E_{RF}$ edges. Each RF creates A oneway broadcast channel: RDC

FIG. 5

RF Egress Rate:
(Updates per unit of time)

$E_\psi$

Route Distribution Channel (RDC)

$S(\psi)$

Route Fountain Subscribers (RFS)

Delay →

Routing Fountain (RF)
$\psi$

Route Collection Tree (RCT)

$S(\psi)$

500

RF Ingress Rate:
(Updates per unit of time)

$$I_\psi = \sum_{v \in S(\psi)} U_v$$

Route Fountain Subscribers (RFS)

RF Distribution of an early "Enable" Message that is then communicated to rest of network through RFS adjacent edges Remaining Traditional Route Distribution

FIG. 11
1100
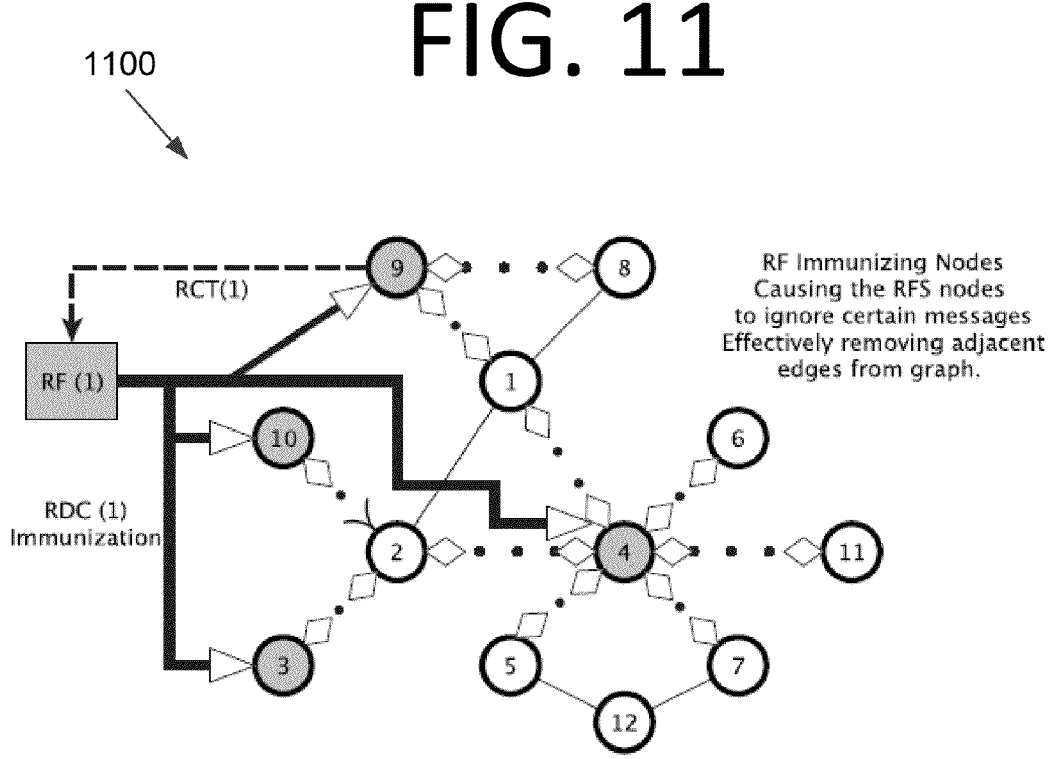
RF Immunizing Nodes
Causing the RFS nodes
to ignore certain messages
Effectively removing adjacent
edges from graph.
Resulting
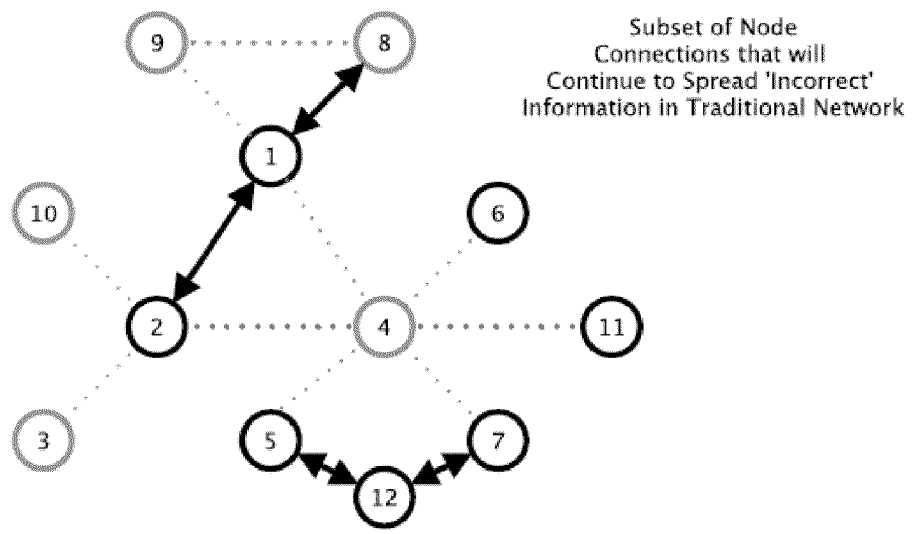
Subset of Node
Connections that will
Continue to Spread 'Incorrect'
Information in Traditional Network

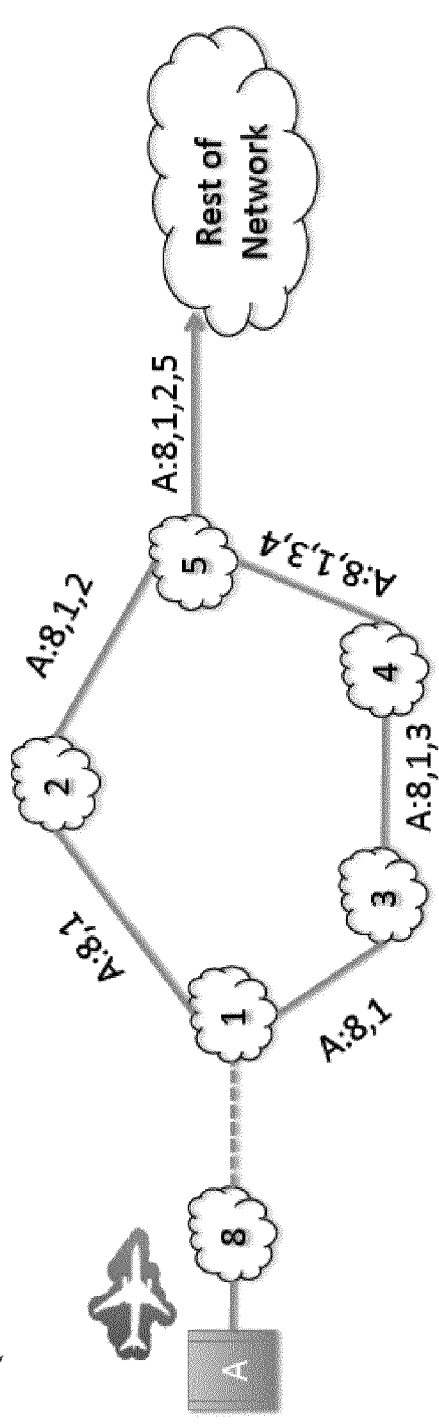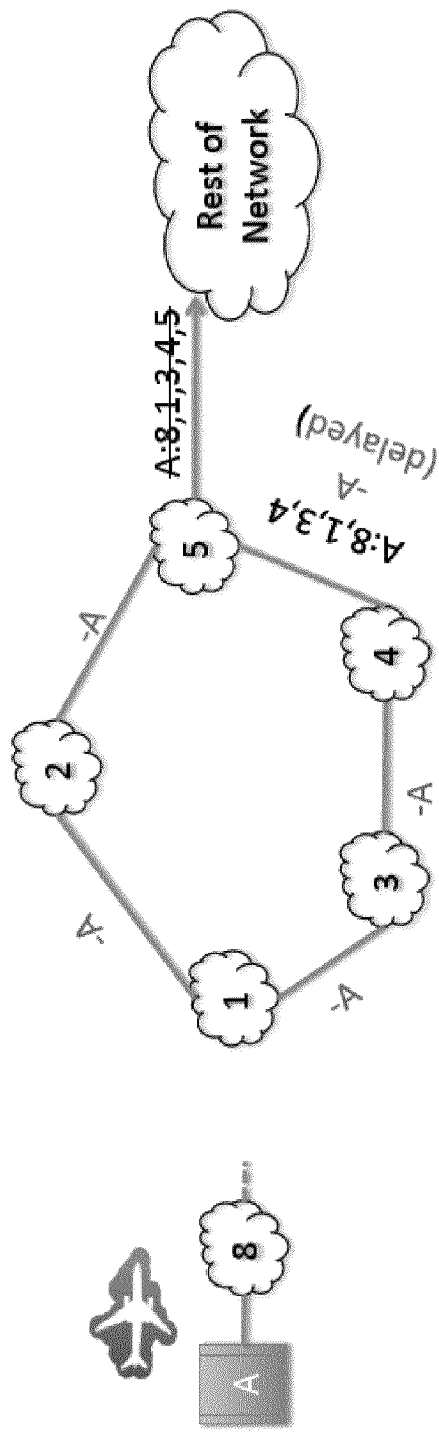
FIG. 13
Inserting Route: Hop by Hop Path Propagation of Destination A from Mobile Net 8

INTER-DOMAIN ROUTING MESSAGE DISTRIBUTION THROUGH WIDE AREA BROADCAST CHANNEL

FIELD

The present invention generally relates to routing, and more specifically, to routing messages between network domains using a wide area broadcast channel.

BACKGROUND

In the past several decades, the proliferation of a common set of distributed routing protocols has empowered growth of interconnectivity and facilitated the development of large inter-domain networks like the Internet. In inter-domain networks, the control system generally consists of a set of routers under the administrative control of different organizations that collectively exchange and act upon the connectivity information received from the routers of neighboring organizations. These organizations generally are Internet Service Providers ("ISPs"), non-ISP corporations, or other organizations that, through their connections, form the Internet.

In general, this interconnectivity has relied on topology-agnostic route exchange mechanisms in which neighboring networks exchange information with one another about what networks can be reached. For example, in conventional approaches, routing messages are often exchanged exclusively between neighboring networks by configuring respective routers in a peering relationship using Border Gateway Protocol ("BGP"). Under current protocol-defined behaviors, when a first router of one network receives a BGP message from a second router of another network, the first router analyzes the information contained in the message. If the message helps the first router to form an ideal path to the message destination, the first router redistributes the message to its neighboring routers. Using this methodology for routing, messages containing network-related routing information propagate throughout a much larger network (such as the Internet) on a "hop-by-hop" basis in a conceptually similar manner to individuals passing information through "hearsay" communication. When all participants follow this approach, enough information may be distributed to allow for interconnectivity between thousands of networks, even though a single network may only be directly connected to a few networks.

The ultimate goal of exchanging this connectivity information is to create a distributed process that facilitates multi-hop forwarding paths from any source to any destination user of the large set of connected networks—ideally along an optimal path. In the general case, the ability to make an optimal next hop decision for a particular fragment of information requires that each network participant be informed of the underlying neighbor connectivity and any identified path restrictions. As networks grow due to the addition of participant organizations and experience increasingly dynamic behavior caused by nodes joining or leaving the network, the task of efficiently distributing the necessary control information to make these decisions also increases in complexity.

The elementary case in inter-domain routing is that each participant has at least one unique piece of information that is of interest to every other participant of the distributed system, and therefore requires sending this message to the rest of the n−1 participants. If n participants transmit each of their unique messages to n−1 participants, the collective task of distributing routing information for the entire system can be generalized as having a distribution complexity of $O(n^2)$ (commonly known as "Big Oh" notation in computer science). In systems like the Internet that include millions of routers, the task of distributing this routing information to nodes within the existing bandwidth limitations can take a considerable amount of time, exacerbated by the effects of dropped packets, duplicate message transmissions, and congested communication links. For networking systems in particular, delays caused by routing updates may be frustrating to users because the physical connectivity is available, but data cannot traverse the network because participant networks have not received the needed information to facilitate the flow of traffic.

While this single router-to-router information dissemination approach has helped to facilitate the incremental growth and expansion of the Internet, such conventional approaches struggle to provide adequate convergence performance to accommodate for future network growth, to accommodate the control plane dynamics caused by mobile networks, and to counter network security threats. For example, the distribution of routing updates through BGP may take minutes, or in some cases hours, to propagate across the entire Internet. During the time these routing updates are propagating, a user cannot assume that traffic will be properly delivered to the intended destination, thus lowering the utility of the network. Beyond these delays, many of the messages transmitted in existing BGP implementations are wasteful in the sense that they contain duplicate or incorrect information.

Also, mobile networks have not been widely integrated with the inter-domain routing processes of the Internet. Instead, methodologies for providing routing-like services for mobile nodes have predominantly consisted of tunneling and agent-based forwarding that create path forwarding inefficiencies. Further, current routing protocols of the Internet are considered vulnerable because no globally accepted mechanism exists for preventing malicious nodes from falsifying information in a routing message to divert traffic in a harmful way from other targeted routing participants. Accordingly, routing protocols, infrastructure, and devices that address these issues may be beneficial.

SUMMARY

Certain embodiments of the present invention may provide solutions to the problems and needs in the art that have not yet been fully identified, appreciated, or solved by current routing technologies. For example, some embodiments of the present invention utilize computing systems with the capability to transmit on broadcast channels, routing fountains ("RFs"), and routing fountain subscriber ("RFS") nodes to more efficiently and effectively provide routing updates to one or more networks.

In one embodiment, a system includes a routing fountain ("RF") configured to receive routing information updates from RFS nodes, participating routers, or other computing systems tasked with packet forwarding. The routing information updates may include, but are not limited to, network addressing information, changes to a routing structure of a network, and/or general information regarding the information of the network. The system also includes one or more routing fountain subscriber ("RFS") nodes configured to send routing information updates to the RF and receive routing information updates from a routing distribution channel ("RDC"). The system further includes broadcast equipment configured to receive routing information updates from the RF and broadcast the received routing information updates to the one or more RFS nodes via the RDC. A "broadcast" may be defined as a single transmission, whether physical or logical, that is intended to be heard by one or more recipients.

Potential broadcast mechanisms include, but are not limited to, satellite broadcast, network broadcast, local area network ("LAN") broadcast, etc.

In another embodiment, a computer-implemented method includes receiving, by a RF, routing information updates from one or more RFS nodes and transmitting, by the RF, the routing information updates to broadcast equipment. The broadcast equipment is configured to broadcast the routing information updates to the one or more RFS nodes via a RDC.

In yet another embodiment, an apparatus includes memory storing computer program instructions and one or more processors configured to execute the computer program instructions stored in the memory. The apparatus also includes a transmitter and a receiver configured to receive communications via a broadcast channel. The one or more processors are configured to receive routing update information from one or more routers in a network and transmit the routing update information, via the transmitter, to a RF. The one or more processors are also configured to receive, via the receiver, routing updates from broadcast equipment via the broadcast channel.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 5 illustrates RF ingress and egress rates, according to an embodiment of the present invention.

FIG. 11 illustrates a network with a containment process, according to an embodiment of the present invention.

FIG. 13 illustrates a $t_{up}$ event, according to an embodiment of the present invention.

DETAILED DESCRIPTION OF THE EMBODIMENTS

Figure 1:
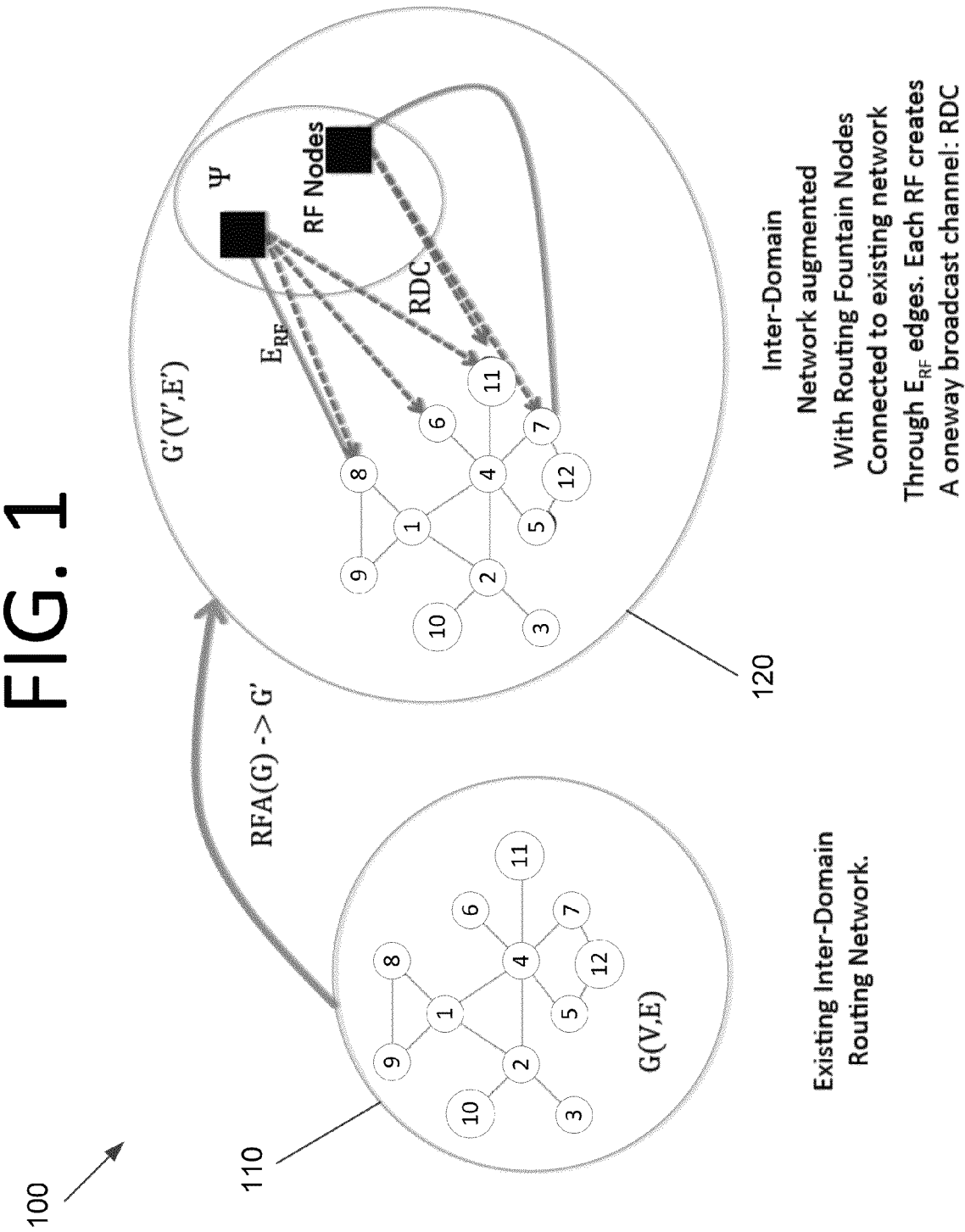
FIG. 1 illustrates a graph transformation, according to an embodiment of the present invention.

It will be readily understood that the components of the present invention, as generally described and illustrated in the figures herein, may be arranged and designed in a wide variety of different configurations. Thus, the following detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Some embodiments of the present invention utilize broadcast-based distribution mechanisms to provide routing information for inter-domain networks. Under such an approach, a routing participant only has to generate a single transmission, and the information of the transmission may be received by all parties capable of receiving the broadcast. Using conventional approaches, if all participants have a unique piece of routing information to propagate across a network of n participants, the network system must accommodate $O(n^2)$ transmissions. However, some embodiments of the present invention that take advantage of broadcast transmissions realize performance closer to $O(n)$, meaning that data is collectively transmitted faster, fewer network resources are utilized, and data transmission and dissemination occurs with higher predictability.

To address the challenges discussed above, a novel paradigm is implemented in some embodiments of the present invention for reducing the transmission costs, propagation delays, and security vulnerabilities of existing hop-by-hop route propagation infrastructures by augmenting them with one-to-many broadcast-based route distribution mechanisms. This approach may be facilitated by novel devices called routing fountains ("RFs") that may collect routing data directly from each of the participant networks and utilize a broadcast channel such as a satellite link to simultaneously push this routing data back to each of the participating routers. By complementing existing routing infrastructures with RFs, the route distribution graph may be augmented in such a way that the route propagation diameter of the network is reduced in terms of hop count and a broadcast-enabled physical layer may be leveraged to drastically reduce the number of transmissions needed to communicate routing updates. Such an approach may be designed to coexist with existing routing infrastructures so that performance gains can be achieved incrementally in a complementary fashion to the current infrastructure.

Facilitating a broadcast-based distribution infrastructure may provide unique opportunities that are not available and/or being utilized by standard inter-domain routing protocols today, such as BGP. First, approaches of some embodiments may provide a mechanism for bounding and controlling how routing information propagates amongst the network participants, and may provide network designers with the ability to estimate and size the network resources that will be consumed by routing. Second, some embodiments may provide a centralized infrastructure where routing data can be verified and authenticated before being distributed to the rest of the network. This provides significant advantages for routing security as it prevents the spread of fictitious information. Thirdly, some embodiments may provide predictability to the route distribution process so other nodes can make tighter assumptions regarding when other routing participants will receive the same information. This is a convenient mechanism that enables the use of inter-domain protocols to facilitate mobile node handovers, and therefore reduces overall path inflation and the need for additional protocols. In a general sense, some embodiments provide a platform where route distribution occurs with better performance than through existing hop-by-hop exchange methodologies, and enable the possibility of offering routing as a service that can be leveraged by future businesses and network researchers in developing further enhancements for inter-domain routing.

Routing for a given network topology is frequently described utilizing the concept of a graph G with a set of edges E and a set of nodes V that can be used as intermediary nodes to reach a set of uniquely identifiable destinations D. FIG. 1 illustrates a graph transformation 100, according to an embodiment of the present invention. Existing inter-domain routing network 110 and an inter-domain routing network augmented with RF nodes 120 are represented by graphs G and G', respectively, where circles represent individual networks V, V' and the set of interconnections E, E' are represented by solid black lines. The existence of an edge between two nodes represents routed connectivity between the two networks.

With respect to existing inter-domain routing network 110, The goal of the routing protocol is to distribute a logical representation of G to all respective participant nodes in V that utilize this global connectivity information to make individual next-hop decisions and collectively form a shortest path to each destination V provided the active edges E. If the network is "connected", this implies that there exists at least one path between all u, v : u, v∈V that can be formed by traversing a series of edges. The function $$d(u,v):u,v\in V$$

returns the length in terms of the number of hops between individual nodes u, v∈V. The function $$D(U,W): U\subseteq V, W\subseteq V$$

represents the maximum path length between any node in the set of nodes in U and W that are subsets of the complete set of nodes in graph V.

With respect to existing inter-domain routing network 110, the operation thereof can be explained by way of example as follows. Assume that node 3 has a routing announcement to make to the rest of the network. Node 3 would thus announce this to node 2, which would, in turn, forward this information to neighboring nodes 1, 4, and 10. Each of these nodes would redistribute the information to its neighbors. The information thus is eventually disseminated to the entire network through a "hop-by-hop" forwarding process.

Inter-domain routing network augmented with RF nodes 120 represents a methodology for transforming existing connected routed distribution graph G into a new augmented route distribution graph G' that can utilize broadcast channels. This transformation function can be represented formally with the function $$RFA(G(V,E)) \to G'(V \cup \psi, E \cup E_{RDC} \cup E_{RF})$$

The RFA equation describes the process of augmenting G with one or more RF nodes represented by the set ψ such that the total set of graph nodes is now V∪ψ. In order to receive information from participating nodes, the RF nodes should be connected to the existing network data plane for G, which occurs through the addition of bidirectional edges $E_{RF}$ that serve to make a single hop or multi-hop path to all other nodes V. In this way, the RF nodes may act as any other receiver or transmitter of data across the network.

In the route distribution process, the RF nodes have the role of serving as the source endpoints of a set $E_{RDC}$ of unidirectional broadcast edges that receive transmissions only from the RF nodes to the subscribers of this data.

$$E_{RDC} = \{\langle \psi, x \rangle : \psi \in \Psi, x \in V\}$$

Also in inter-domain routing network augmented with RF nodes 120 are the RF nodes, edges $E_{RF}$ connecting them to the original multi-hop graph, and additional one-way broadcast edges $E_{RDC}$. Messages distributed through the RF-enabled paths traverse at least one edge from the set of $E_{RF}$ and $E_{RDC}$.

Figure 2:
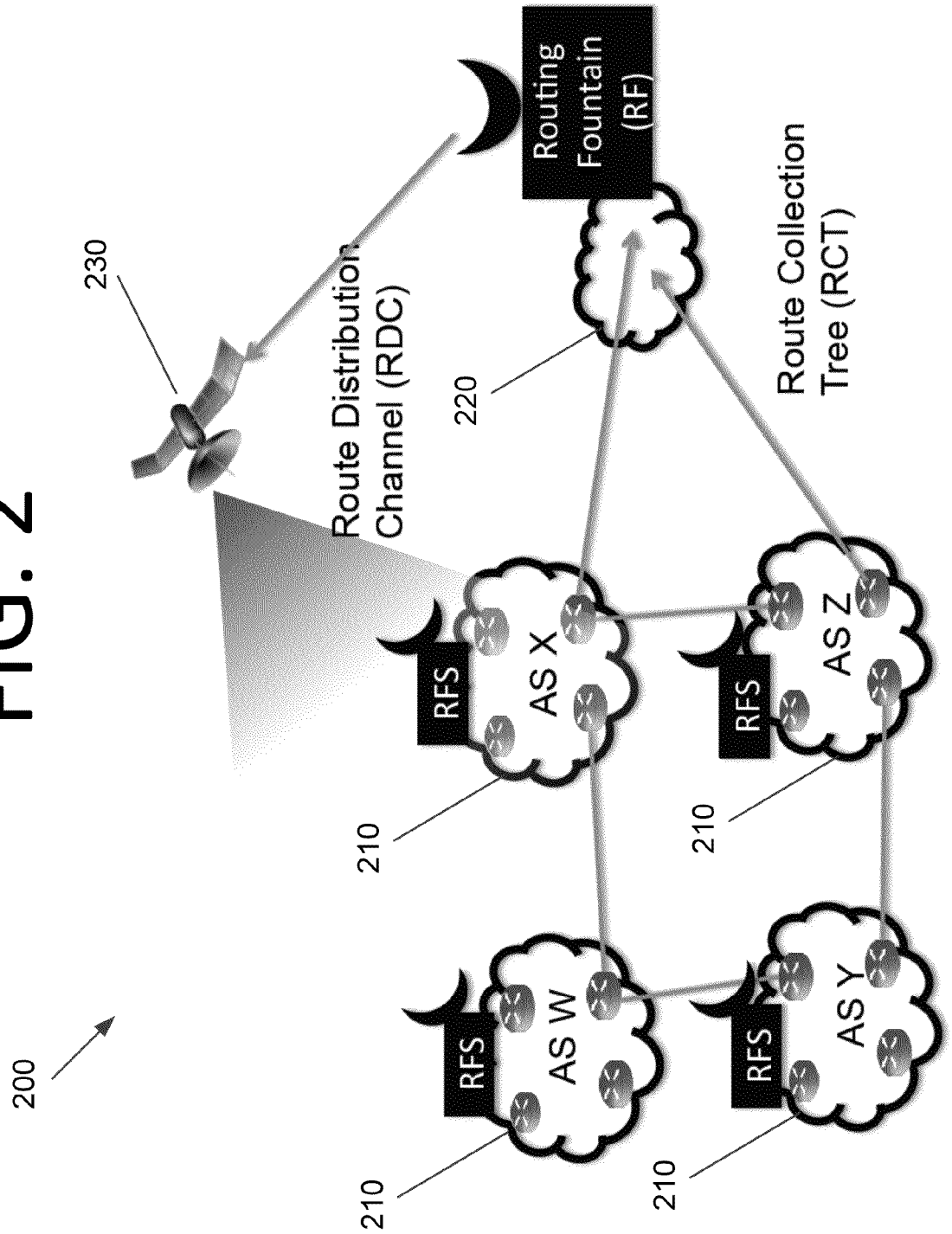
FIG. 2 is an architectural diagram illustrating augmenting existing networks with RF functionality, according to an embodiment of the present invention.

FIG. 2 is an architectural diagram 200 illustrating augmenting existing networks with RF functionality, according to an embodiment of the present invention. Individual networks 210, denoted by AS W, AS X, AS Y, and AS Z, are interconnected and each network 210 has a RFS device, or node. Each network 210 has multiple routers. A route collection tree ("RCT") 220 is connected to networks 210 and is in communication with a satellite 230 via a RF. Each RFS device within networks 210 can receive signals that are broadcast from satellite 230, forming the route distribution channel ("RDC"). Participant networks 210 may transmit routing updates collected from local routers in their respective networks to the RF and, in turn, receive updates from other networks through the RDC provided by satellite 230, making each network 210 an RFS network. Using RFs in this manner leverages one-to-many dissemination of routing information and complements existing routing exchanges. Using broadcast channels in a practical manner typically requires additional infrastructure and coordination, as well as interfacing with existing routing processes.

Distribution of Routing Information

The overarching goal of the RF architecture is to provide an infrastructure for the dissemination of routing information that brings additional performance value to the network. For this reason, the term "routing information" is used as a broadly encompassing category of data relevant to a distributed routing process. Routing information can refer any type of information utilized by routing protocols originated by an individual node or group of nodes that is of interest to the larger set of routing participants. In current routing protocols, the information exchanged primarily consists of identifiers for unique destinations, such as IP addresses and various forms of neighbor connectivity information that come in forms of links states or data paths. Future routing protocols and algorithms could potentially benefit from additional information, such as link congestion information, that is currently not shared or distributed because of the lack of a mechanism to do so. Routing information may include, but is not limited to, the following.

Graph Connectivity Information: A set of information that describes the connectivity between the networking participants (nodes) in a connected routing network. The entire graph of participants and their connections can be described as a collection of edges. The set of edge descriptor tuples $R_G$ may be obtained by $$R_G = \{\langle u,v \rangle\} : u,v \in V$$

In order to ensure that each node has sufficient information to guarantee the formation of shortest paths, the RF should eventually distribute the entire graph to the network participants, and therefore the size of $R_G$ is proportional to the number of edges in the original connectivity graph $G(V, E)$, $|R_G| \propto |E|$.

Destination-to-Node Mapping: In routing protocols, it is common to have a unique set of destination identifiers that are different than the label associated with a particular edge node. For example, a set of destination IP addresses are the destination identifiers that may be allocated to a particular autonomous system ("AS"). The term "AS" is used in BGP to describe separate organizations. In the case of IP protocols, traffic in the packet headers is not destined to a particular AS, but rather to a given IP address destination identifier. However, the paths to reach a set of IP addresses are selected based on the AS identifiers. It is typical, therefore, that routing protocols require the distribution of this destination identifier to node mapping to be utilized in conjunction with the network graph for routing algorithms. This set of information may be designated by $$R_D = \{\langle \text{destination identifier}, v \rangle\} : v \in V$$

The number of destination identifiers is independent of the size of the graph. In practice, it is typical for multiple ASs to announce multiple destination identifiers. Variations of this type of information exist with additional field values (e.g., capacity, latency, loss probability, etc.) mapped to the edge identifiers in $R_G$ or the edge identifiers in $R_D$.

Commonly used routing algorithms primarily make routing decisions based on the edge connectivity information received. Conceivably, routing algorithms could make different decisions if they were offered additional information, such as how congested a certain edge is or information describing the types of nodes that a particular user desires to avoid. Because this information is not conventionally available to network users, routing algorithms that can make use of this information are rare. For example, with the prevalence of resource exhaustion attacks like distributed denial of service attacks, there could be potential benefits gained from distributing additional information notifying networks that a particular network is under stress and enabling routing algorithms to select alternate paths. Therefore, the term routing information, as used herein, broadly encompasses any type of information that is useful for distributed routing decision algorithms to improve the efficiency of the network.

Routing Fountains and Routing Fountain Subscriber Nodes

Figure 3:
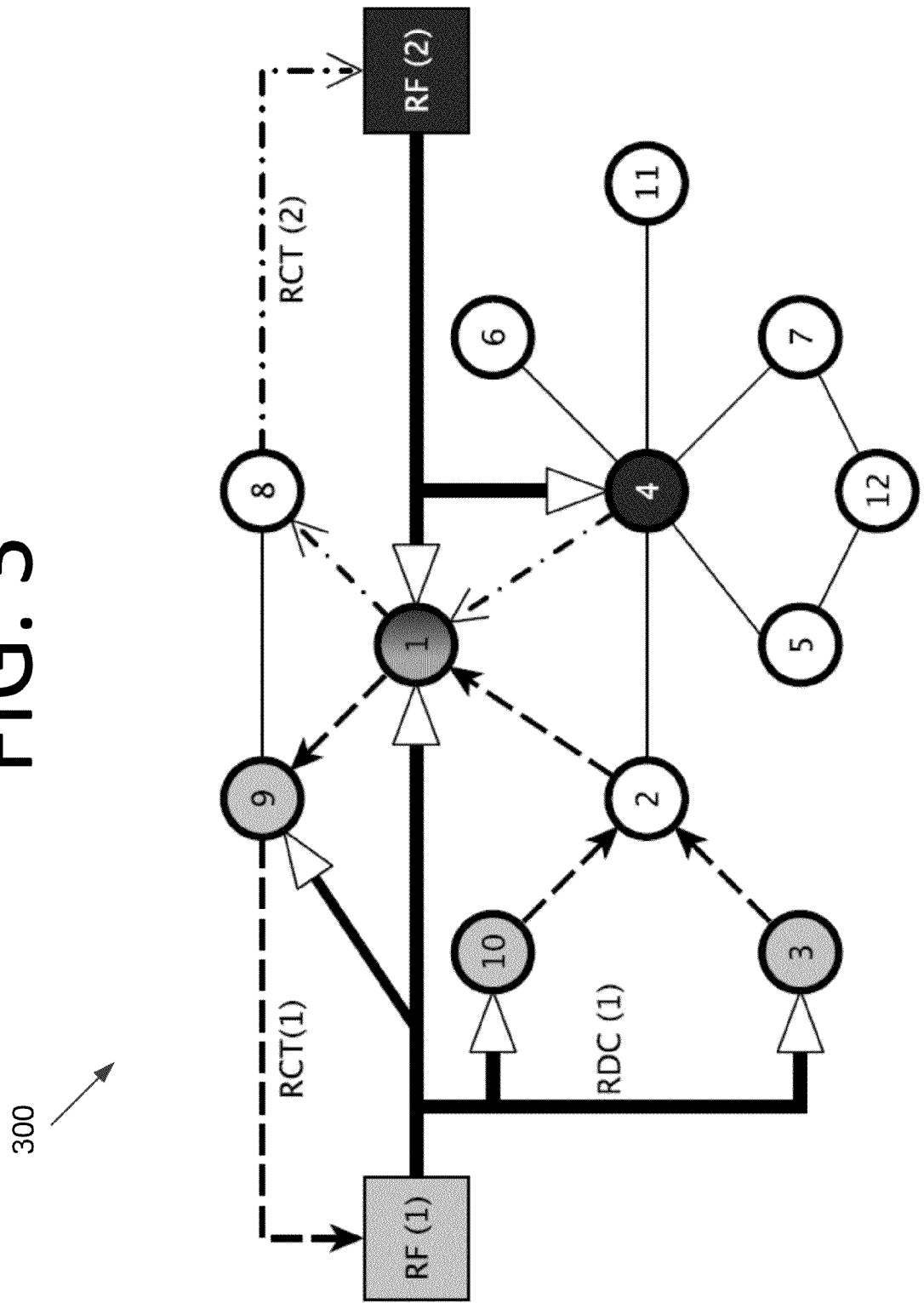
FIG. 3 illustrates a network augmented with RFs, according to an embodiment of the present invention.

A RF is a network node tasked with collecting routing information from other network nodes and broadcasting the information to the RFS nodes. FIG. 3 illustrates a network 300 augmented with two RFs, according to an embodiment of the present invention. The networks are equipped with respective RFS devices, respective RCTs, and a RDC. The set of RFs interacting with a particular network G is described by $\Psi$. In FIG. 3, $\Psi = \{RF_1, RF_2\}$.

Each RF receives routing information along the collection path called the RCT, consolidates this information so that it is useful to the larger receiver set, and then transmits this unique information through a medium that is effective at reaching a large number of participants. This channel is referred to as the RDC. In some practical embodiments, a RF is a device that is capable of retransmitting information for thousands of networks. This task is not beyond the capabilities of many multicore computing systems available on the market today, as the collection functions of many embodiments are similar in resource requirements to what web servers currently perform.

Multiple RFs can be used to provide fault tolerance when an individual RF fails, there is a need for alternate pathways in cases of critical link failures, different networks require specially tuned routing performance, and/or for other unknown business or political reasons. Because each RF does not have an explicit dependence on other RFs in many embodiments, this allows the flexibility for RF use in independent, replicating, and asymmetric configurations.

Independent: In independent operation, multiple routing fountains exist and their primary functions of collecting and redistributing information occur completely independently of one another. Some RFS nodes may subscribe and provide information to multiple RFs. However, those RFs are generally not aware of each other and generally do not share information. Independent mode is the mode presented in FIG. 3, where nodes 1, 3, 9, and 10 communicate and receive updates from RF(1). Similarly, nodes 1 and 4 communicate their updates to RF(2). Node 1 is subscribed to both RFs, and therefore sends its information to and receives information from both RF(1) and RF(2).

Figure 4:
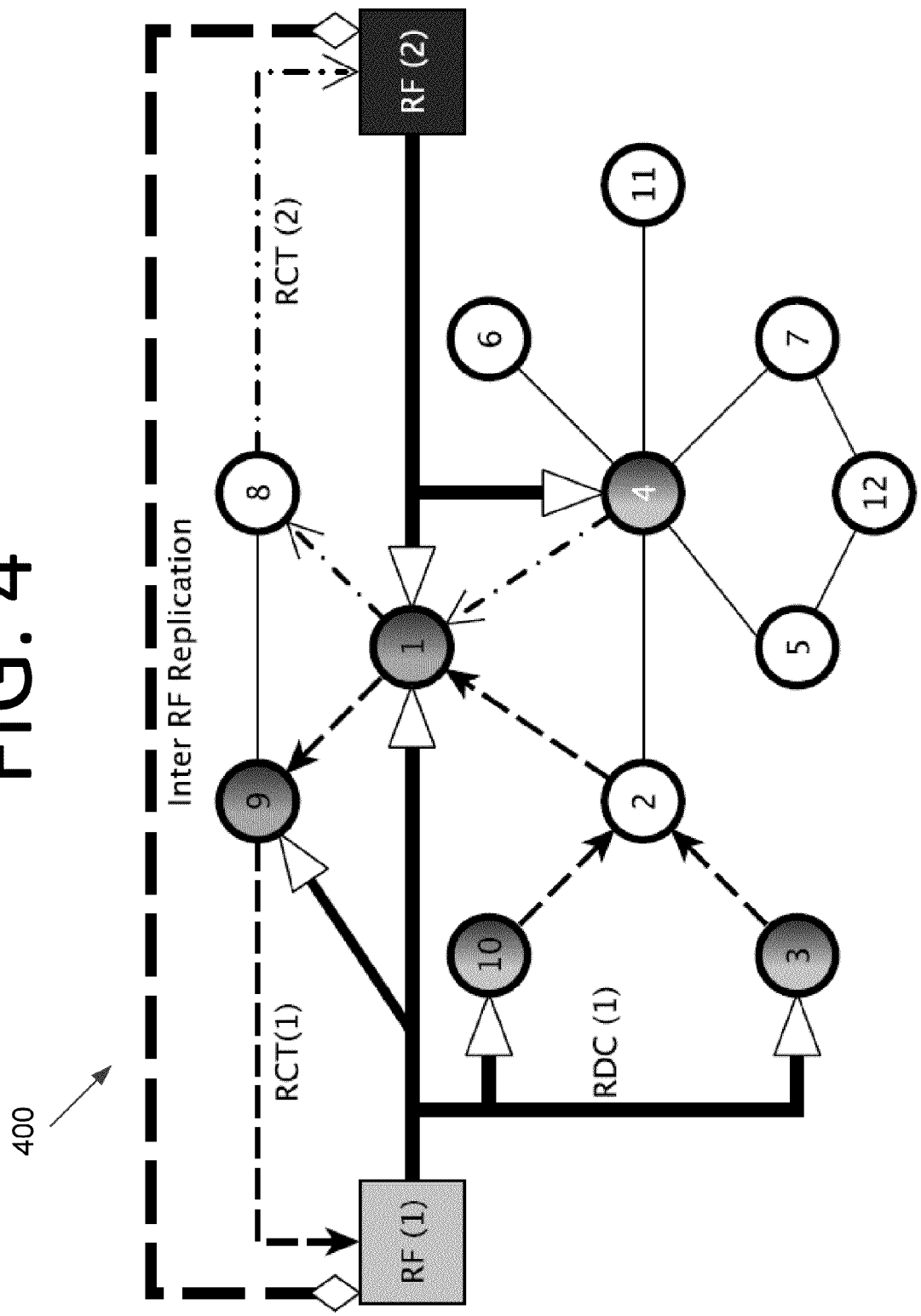
FIG. 4 illustrates a network having inter-RF replication with direct connectivity between each RF, according to an embodiment of the present invention.

Replicating: In this mode, two or more RFs have established logical connectivity between one another and will send a copy of all information received to one another. Each RF, in turn, takes the information received from another RF as additional input and sends the received information out on its respective RDC. In this way, the RFS nodes of a single RF can be entitled to the additional information of other RFs, as shown in network 400 of FIG. 4.

Asymmetric: In asymmetric configurations, some RFs may have asymmetric relationships with other RFs where certain data is shared between some RFs, but not between all RFs.

A RFS node is a network participant that transmits originating routing information to one or more RF nodes for broader distribution, and receives routing information from one or more RF nodes through a broadcast channel. The RFS node may be any suitable computing system, but should have at least a receiver such that routing messages can be received from broadcast equipment via a broadcast channel. The RFS node may also be considered as the entire network when a single routing fountain adaptation device ("RFAD", discussed later) is used for the network. However, a single network may have multiple RFS nodes capable of communicating with an RF, and the term RFAD refers to the hardware that communicates with the RF. Corresponding to each RF is a set of RFS nodes that subscribe to the information broadcast from the RF and also provide data to the RF.

The data that each RFS node forwards to the RF depends on its connectivity characteristics and other relevant configuration information that the RFS node is programmed to broadcast to the rest of the network. For example, in the case of performing shortest path routing, each RFS node may initially provide information about what neighbors it is directly connected to, and if a new neighboring connection is added or a previously announced connection is no longer valid, the RFS node may announce this information as well. To gather this information, the RFS node may interact with other routing processes in the network. This process may be enabled by each representative network equipped with a RFAD. The RFAD is an "adapter" device that interfaces back and forth from each individual network to the larger RF-based dissemination system. The RFAD may be part of an RFS node and may interface with other routers in the network.

Each $RF_x \in \Psi$ is associated with a subset of nodes referred to as RFS nodes of V, and the function $$S(RF_X) \rightarrow RFS_x : RFS_x \subseteq V$$

describes which nodes are associated with which RF. For example, in FIG. 3, $S(RF_1)=\{1,3,9,10\}$ and $S(RF_2)=\{1, 4\}$. Network 300 is simultaneously subscribed to $RF_1$ and $RF_2$.

Each network is generally responsible for gathering unique connectivity information relevant to the network, such as the network's connectivity with neighboring networks and information about destination changes. In many practical embodiments, a network's RFAD may interact with other routing protocols that are operating within that network, acting as a participant in protocols like internal Border Gateway Protocol ("iBGP") and Open Shortest Path First ("OSPF") to collect this information. However, the RFAD is not necessarily limited to collecting information through an intra-domain protocol. Upon receiving new connectivity information, the RFAD may act as the representative device for the RFS nodes and forward this information to the RF on the RCT. The RFAD may also be responsible for receiving the information that is distributed from the RF via the broadcast equipment, and similarly for communicating that information to participant routers in the network to make the appropriate forwarding decision.

Each RFAD may be configured as the respective representative for an attached network, which allows the attached network to collectively be considered a RFS node. In practice, the RFAD generally does not handle a large number of simultaneous connections, and therefore does not require significant computational power. The RFAD can be integrated as a software component on an existing router or function as a standalone device. The key requirement in some embodiments is that the RFAD have the proper physical interfaces to send routing data on the RCT, the proper physical interfaces to receive routing data on the RDC, and the respective interfaces to interface to the relevant routing devices belonging to that organization. In practice, each organization should generally have multiple RFADs to mitigate against the failure of a single RFAD. To existing routers today, the data received from the RFAD can be considered out-of-band information as it is generally received extraneously to the current protocols operating on that router.

Route Collection Tree

The RCT collectively refers to the infrastructure that allows each RFS node to transmit routing information reliably and securely to the RF. In a given routing architecture, a bidirectional forwarding path should exist between each RFS node and the respective RF. In the case that a RFS node is associated with multiple RFs, the RFS node should participate in the RCT corresponding to each RF. The RCT represents a logical connectivity path that exists between each of the RFS nodes and the RF, and the RCT forwards information from RFS nodes and the RF. In cases where an existing routing protocol exists, the RCT may simply be another instance of how user traffic is sent from one destination in the network to another.

The primary flow of data is generally one-way, as original routing data may only be communicated from the RFS to the RF on the RCT in some embodiments. However, the mechanics of reliable secure communication, such as exchanging keys and the acknowledgement of received data in Transmission Control Protocol ("TCP"), require a bidirectional communication path. In the absence of having updates to send, each RFS node may send keep-alive messages to the RF to validate the viability of its information and confirm that that the network is still operating.

The existence of the RCT outside of the RF architecture is a non-trivial assumption for some architectures, as network protocol designers have traditionally designed protocols that can create forwarding paths without any global path coordination. The architecture of some embodiments may be designed with the general assumption that this pathway exists, and therefore the architecture may not be defined to operate independently of another routing protocol performing this task. In some embodiments, it is assumed that some sort of forwarding path between the RFS nodes and the RF exists a priori to the use of the RF architecture.

Route Distribution Channel

The RDC is a broadcast-based communications mechanism that transmits the collected set of routing information from the RF to each RFS node.

RDC Physical Channel Characteristics

Effective gains in bandwidth savings and convergence times may be realized through utilizing a mechanism that can reach the largest number of networks simultaneously. Large scale broadcast channels, such as satellite downlinks, are ideal candidates for this task due to their large geographical range. Commercial use of such technology includes DirecTV® and satellite radio. However, other broadcast mechanisms, such as broadcasting aircraft and well-positioned broadcast towers, may also be used.

Other broadcast mediums exist, such as gigabit Ethernet, and may be used extensively in Internet Exchange Points ("IXPs"). IXPs serve as the physical peering location for networks that enter into an inter-domain peering relationship with other networks. Although not frequently used for its broadcast capabilities outside of a LAN, the use of Ethernet as the physical and logical connectivity layer between networks also means that the broadcast capabilities of Ethernet can be used to enable the RDC.

RDC Bandwidth and Flow Control

Each RDC may be constrained by a maximum bandwidth, and as such, may only be able to handle a maximum number of updates in a given time period. Updates in excess of this capacity may experience queuing delays. As such, the RDC should be statistically sized to deliver a certain number of routing updates in a given time period based on the number of updates expected to be generated by the subscriber networks.

Unlike the RCT, where the flow of data can be regulated through a transport protocol such as TCP, other mechanisms should be utilized on the RDC channel to prevent overwhelming the receivers with too much routing information. The bandwidth of the RDC should be specified according to the number of expected updates so as to provide acceptable delay to the network participants.

RDC Reliability

A function of networking transport protocols is their ability to transmit data with some assurance and guarantee that the data will reach a destination without any errors. Application developers usually do not worry about network transmissions if they can rely on TCP. However in one-way broadcast channels, the burden is generally on the application developer to develop methodologies that can be used to compensate for data losses. Some factors that should be considered in distributing generic data over these channels are listed below.

Scalability: How many nodes are intended to receive the information simultaneously?

Channel and Client Heterogeneity: Do all of the data channels to recipients have the same or similar loss and bit rate characteristics?

Content Heterogeneity: How varied is the content that will be delivered through this system in terms of pattern and size?

Reliability: What are the reliability requirements for the system in terms of the amount of loss and downtime that can be tolerated?

Congestion Control: Can the messaging intended for the receivers tolerate delays or losses due to congestion of the delivery channel? Is the traffic bursty or stable?

The basic methodology for compensating for traffic losses in one-way broadcast channels is to transmit additional information. When transmitting an original message of size n packets, the sender should encode the original data in such a way that the total transmitted signal now consists of n+k packets. The k additional packets are considered parity information such that as long as any n of the transmitted n+k packets arrive at the destination, the original message can be reconstructed. The key strategy is to send enough parity information to provide redundancy in case some packets are lost, but not to send so much parity information that overhead resources are wasted. Such mechanisms are probabilistic and cannot guarantee the reliable delivery of data. To compensate for this probabilistic nature, data can be periodically retransmitted or requests for retransmission can be made over a different bidirectional channel.

RF Functional Overview

The main task of the RF architecture is generally to augment and improve upon the methodologies of distributing routing data that exist in conventional topology-agnostic routing protocols. Such augmentation/improvement may improve performance and/or increase security. This task can be broken down into the following two phases:

Collection of Routing Data from each RFS Node through Transmissions on the RCT: Routing information originating from an RFS node should generally traverse along the existing networking infrastructure to the designated RF. This implies the need to have a data forwarding path from the RF to each of the RFS nodes. The extreme case of this process occurs when the RF and a particular RFS node are on extreme opposite sides of the network, where the hop count between them is the diameter d of the graph. The transmission of data along the RCT does not encounter routing protocol retransmission timers as these transmissions are only being forwarded by the intermediary networks, and not being processed by each intermediary network's routing process.

Dissemination from RFs to RFS Nodes on the RDC: Once the routing data has been received at the RF, the routing data is transmitted from the RF to all of the RFS nodes with a single broadcast on the RDC. The rate at which these transmissions occur is limited by the design of the RF in serving the updates that are received, as well as the rate at which data can be transmitted on the RDC.

Ingress and Egress of Routing Updates

The function that the RF performs can be characterized as a First Come First Serve ("FCFS") server. Routing updates arrive at the RF, are queued for processing, and are then distributed no faster than the time it takes to transmit each update back to the larger set of RFS nodes through the broadcast channel. The rate of updates produced by each of the subscriber nodes can vary during any particular time. When the number of updates can be measured for a given time interval, the symbol $U_{x,t_i,t_{i+1}}$ may be used to describe the number of updates generated by node x : x∈V during the time interval $t_i$ and $t_{i+1}$. The generalized form $U_x$ represents the average rate of updates generated over unspecified periods of time.

For each RF ψ, the cumulative number of updates arriving at the routing fountain ψ may be described between interval $t_i$ and $t_{i+1}$ with the term $I_{\phi,t_i,t_{i+1}}$. Over large amounts of a time, this value can be averaged into a collective ingress rate represented by I. The number of updates egressing the system during a specified time interval may similarly be described by the term $E_{\phi,t_i,t_{i+1}}$, and the average egress rate of the RF is described by the term $E_\phi$.

FIG. 5 illustrates RF ingress and egress rates 500, according to an embodiment of the present invention. Each RF φ∈Ψ services a set of RFS nodes S(φ)∈V, where each node provides routing updates for redistribution at a given update production rate described by the function U(x): x∈V. The total amount of updates arriving at the RF is represented by the term $I_\phi$ and consists of the sum of the updates generated by all of the subscribers. The egress rate of updates from the RF is constrained by the transmission capacity of the RDC, $E_\phi$.

The ingress of updates into the system is equal to the sum of the number of updates generated by each set of RFS nodes.

$$I_{\varphi,t_i,t_{i+1}} = \sum_{\forall x: x \in S(\varphi)} U_{x,t_i,t_{i+1}}$$

Because the RF is performing a forwarding service, the system is only stable if the long term average of updates arriving at the RF is less than the maximum capacity for egressing updates. The RF system cannot, in the long term, process more updates than it has the capacity to service, and the RF system should be intentionally designed with the criteria $I_\phi < E_\phi$. The ingress rate of the RF is influenced by the frequency of routing updates and the number of nodes producing routing updates. Therefore, the RF should be designed with consideration of both the dynamics of the nodes and the number of nodes the RF is servicing.

In some cases, it may be useful and appropriate to apply queuing models to estimate the expected number of updates in the RF during any given time, as well as estimate the expected queuing delays of the system. For example, if one can assume that because the RF distribution service is limited by the RDC bandwidth and the size of a routing update never changes, the egress rate of the system can be considered a fixed service time calculated from the bandwidth of the RDC and the size of a routing update.

$$T_s = \text{Routing Update Size (bits)}/RDS \text{ Bandwidth (bits per sec)}$$

If the process by which the routing updates are generated can be modeled as Poisson processes where each node generates updates with a rate of $\lambda_x : x \in V$, and if the routing updates can be considered independent events, it can also be generalized that the sum of these rates can be used to represent the total ingress rate at the RF $\lambda_\phi = \Sigma_{x:x \in S(\phi)} \lambda_x$. If all networks generate updates at the same average rate $\lambda_x = \lambda_y$: $\forall x, y \in S(\phi)$, then $\lambda_{100} = |S(\phi)| \lambda_x$.

For a given network, if the previous assumptions hold true, then the M/D/1 queuing server model can be utilized to estimate the amount of time an update will spend in the system based on the average rate that each network generates an update. The average wait time W of an M/D/1 queue can be estimated using the Pollaczek-Khinchin (P-K) formula.

$$W = \lambda_\phi T_s^2 / 2(1 - \lambda_\phi T_s)$$

Similar known formulas for the expected number of items in a M/D/1 server can be utilized to estimate the size of the RF memory buffers.

Figure 6:
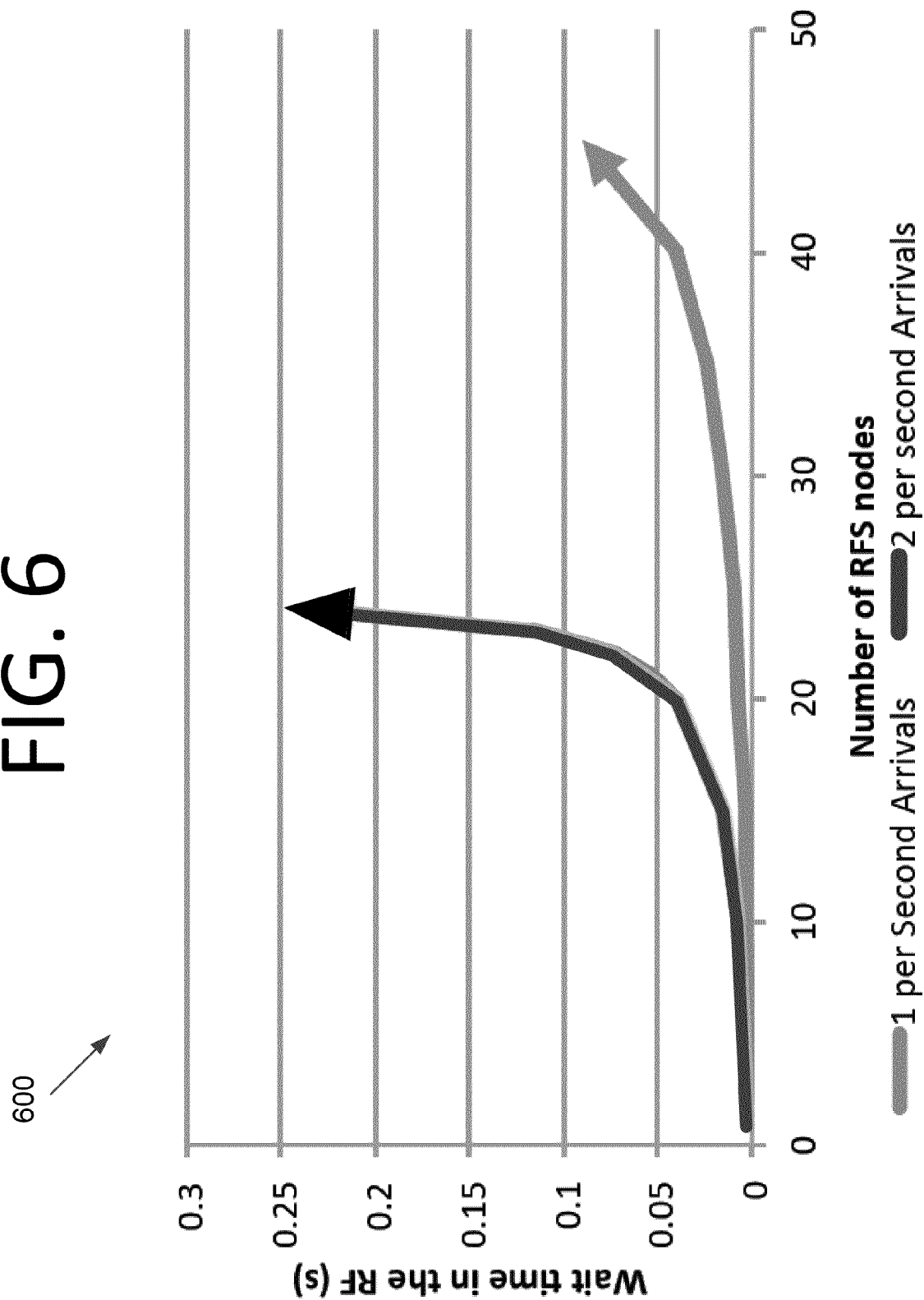
FIG. 6 is a graph illustrating a sample delay plot, according to an embodiment of the present invention.

As an illustration comparing how expected wait times vary in an M/D/1 model of the RF, the expected wait time in the system can be plotted based on the number of RFS nodes providing routing updates at the same mean rate, as shown in FIG. 6. FIG. 6 is a graph 600 illustrating a sample delay plot utilizing a service updates per second rate $\mu$ of $\mu=50$ routing updates per second and $\lambda \times N$, where N is the number of RFs, according to an embodiment of the present invention. Two plots are plotted, $\lambda=1$ and $\lambda=2$. The expected wait time is computed utilizing an M/D/1 model for a server with a fixed service rate of 50 updates per second (or expressed as a constant service time of 0.02 seconds), and varying the number of RFS nodes. The lighter plot shows the average amount of wait time in the system with each node providing an update with a Poisson process of one update per second and increasing the number of nodes that generate updates at this average rate. The darker plot demonstrates the comparison in wait times if the update rate changes from one update per second to two updates per second for each of the nodes.

The system becomes unstable with $\lambda > 1/T_s$. This example demonstrates the sensitivity to correctly estimating the RF service capacity in light of the offered load. The capacity of any RF is limited by the amount of routing updates it can egress at a given time, and therefore, the RF should have an egress capacity greater than the rate of arriving updates. Network designers should keep this in mind in designing RF-based distributions.

Inter-RF Peering Relationships

Figure 7:
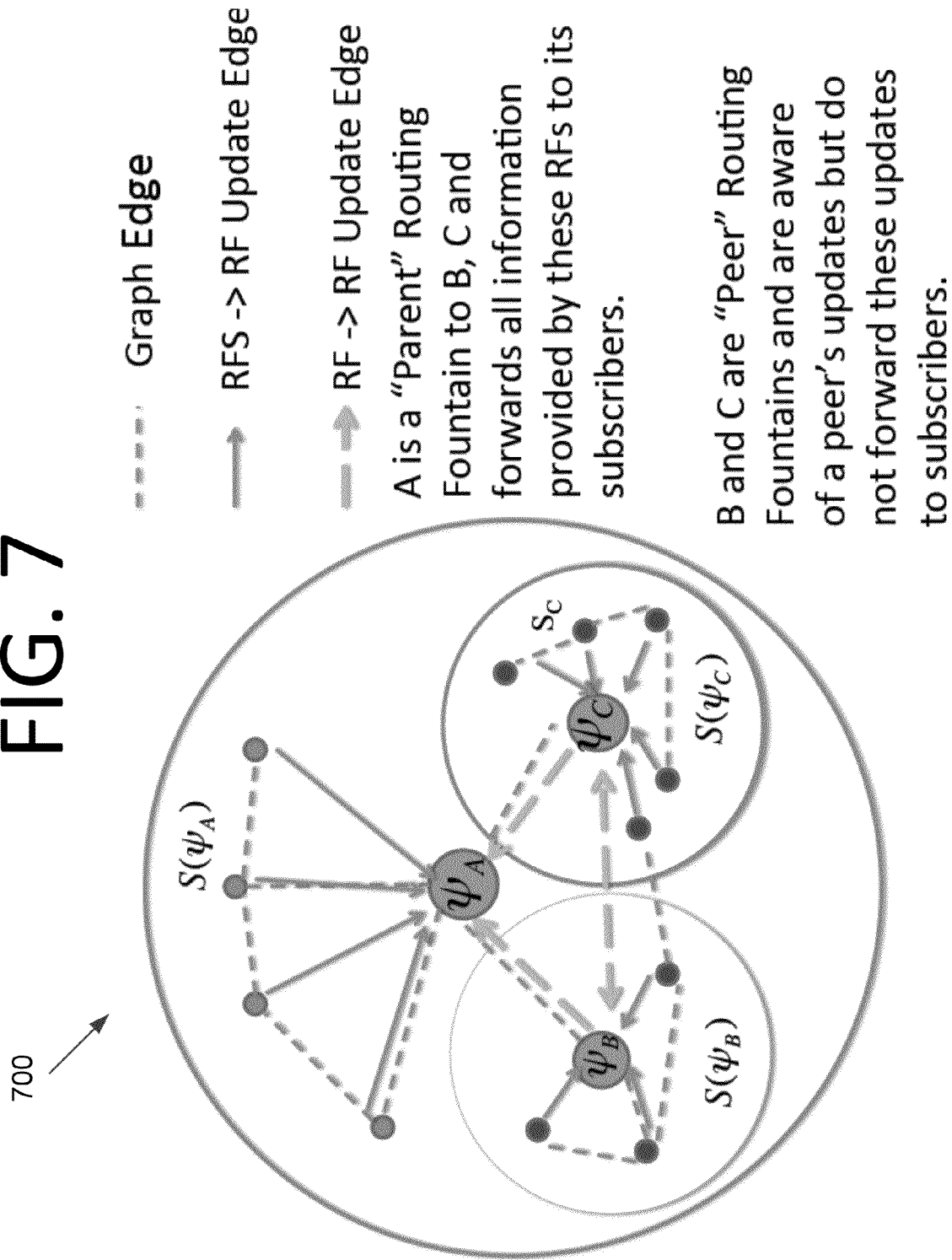
FIG. 7 illustrates an example of hierarchical RFs, according to an embodiment of the present invention.

FIG. 7 illustrates an example 700 of hierarchical RFs, according to an embodiment of the present invention. RFs $\phi_A$, $\phi_B$, and $\phi_C$ are each routing fountains with their own respective subscribers $S(\phi_A)$, $S(\phi_B)$, and $S(\phi_C)$. $\phi_A$ is shown as the role of a parent RF because both $\phi_B$ and $\phi_C$ are subscribers of $\phi_A$, and $\phi_A$ retransmits all information received from the child RFs. $\phi_B$ and $\phi_C$ are in a peering relationship as they are both subscribers, and thus are aware of one another's updates. However, $\phi_B$ and $\phi_C$ do not retransmit the updates to the larger set of network nodes.

As part of the RF architecture, relationships may be defined in some embodiments that enable the creation of hierarchies and collections of RFs. Each of these RFs can be designed with various capacities and built to accommodate variable ingress and egress rates dictated by the activity of the network. By design, subscribers of a RF are receiving routing updates at a given rate and expect the RF to redistribute the updates within an expected time frame.

If the number of RFS nodes or the network dynamics change, then a potential solution is to utilize multiple RFs or allocate additional bandwidth resources to deliver the expected routing performance. In some embodiments, multiple RFs are sized to accommodate multiple types of network balancing of both resources and desired convergence times. Relationships may also exist where RFs can share information that they received from their immediate subscribers with other RFs.

Parent/Child RF Peering

In a parent/child peering relationship between two distinct RFs, there exists a parent RF $\phi_P$ that will be forwarded all information from a set of child RFs. For example, if there are two child RFs $\phi_{C1}$ and $\phi_{C2}$, information is forwarded from $\phi_{C1}$ and $\phi_{C2}$ such that $\phi_P$ receives all of the updates originating from each child RF's set of subscribers $S(\phi_{C1})$ and $S(\phi_{C2})$. The child RFs, but not necessarily their respective sets of RFS nodes, will also be recipients of the information transmitted by the parent RF as though the child RFs were subscribers of $\phi_P$. However, the child RFs do not transmit and forward this information to their subscribers.

To accommodate having to distribute additional routing updates beyond its own RFS nodes, the egress rate of the parent RF should be sized to handle the sum of the ingress routing updates provided by its direct subscribers and all subscribers of the child RFs. For example, in the example of $\phi_P$ above, the capacity of $\phi_P$, $E(\phi_P)$ should be $E(\phi_P) > I_{\phi c1} + I_{\phi c2} + I(\phi_P)$.

Sibling RF Peering

In a peer-to-peer RF relationship, there is a RF $\phi_x$, that will be forwarded, and will forward to, a set of peer RFs $\Psi: \phi_{p1}$, $\phi_{p2}$ all of the information the RF receives from its respective RFS nodes. RF nodes participating in sibling peering do not redistribute the information from a peer RF to its RFS nodes in many embodiments, but do keep a locally stored graph that is the composite of information from the RF's own RFS nodes and the information provided by the peer. This type of peering relationship allows for an RF node to store additional information, but does not require additional broadcast resources. The main advantage of this type of peering is that although each RFS node may not have received information about another RF's subscribers, the RF of the RFS node can provide additional path messages to help direct traffic based on a neighboring RF's subscriber set.

Partial Use of Routing Fountains

Changes to an existing routing infrastructure generally have a better chance of success if they can be introduced incrementally. A significant feature of some embodiments of the RF architecture is that they are designed as a complimentary distribution technique to existing routing processes and protocols, and therefore can coexist with existing processes that do not interact directly with the RF architecture. Scenarios where all participants of a particular routing network are not utilizing the RF constitute what is referred to as a partial usage scenario. This aspect of RF design makes such embodiments useful and convenient for implementation in conventional systems as RFs can be gradually introduced to new networks, but can have significant benefits even with only a fraction of the nodes utilizing the RFs.

Although there are many factors influencing when different participant nodes would transition to utilizing a RF, it is helpful to understand the benefits that the greater network will experience when a subset of nodes are equipped to participate in the RF architecture. In partial use scenarios, the RF architecture in some embodiments can provide the following mechanisms that can also benefit non-participants of the RF architecture: (1) an enable mechanism that can accelerate information diffusion throughout the network; and (2) a contain mechanism that can prevent the spread of information. The utility of a strategy in selecting the set of nodes that will use the RF architecture is also discussed below, as the participation of different nodes will have varying performance benefits to the entire set of network participants. The selection of which nodes to equip as participants of the RF architecture may be analogous to the key player selection problem in the context of social networking. Evaluation metrics may be used for evaluating the effectiveness of the selection strategy of the RF architecture. Equipped with these network-wide evaluation metrics, node-specific criteria may be introduced that may be utilized in selecting subsets of nodes.

RF-Enabled Early Message Distribution

The first function described in partial use scenarios is the utility of the RF in distributing routing information faster than information can spread with hop-by-hop dissemination. In other words, the message transmission path of message network x→RF→RFS information serves the role of helping to start the dissemination of data throughout the entire network and helps to reduce the distribution time. This occurs because protocol-dependent hop-by-hop distribution is subject to per-hop hold timers and processing times. In these partial use scenarios, the use of the RF serves as a tool for partially bypassing these delays and inserting information into various locations of the greater network that initiate the distribution of data from multiple locations of the larger graph G. This can be considered a partial seeding of the information dissemination process by utilizing the RFS nodes.

This activity is referred to as the RF enable function because this data distribution process enables the dissemination of routing information faster than the standard route distribution process. The general process of this enable activity is that a node disseminating a message sends the message both through the existing routing protocol and also sends the message to the RF. The RF will broadcast this information to the RFS nodes. The RFS nodes will then disseminate this information to their immediate neighbors $v \notin S(\Psi)$ through the existing routing protocol. In order for a message to be distributed and enabled, the message should contain information that can be understood or formatted to the existing routing protocols as the message should be formatted in such a way that the message can be injected back into the existing hop-by-hop dissemination process and be interpreted correctly.

Figure 8:
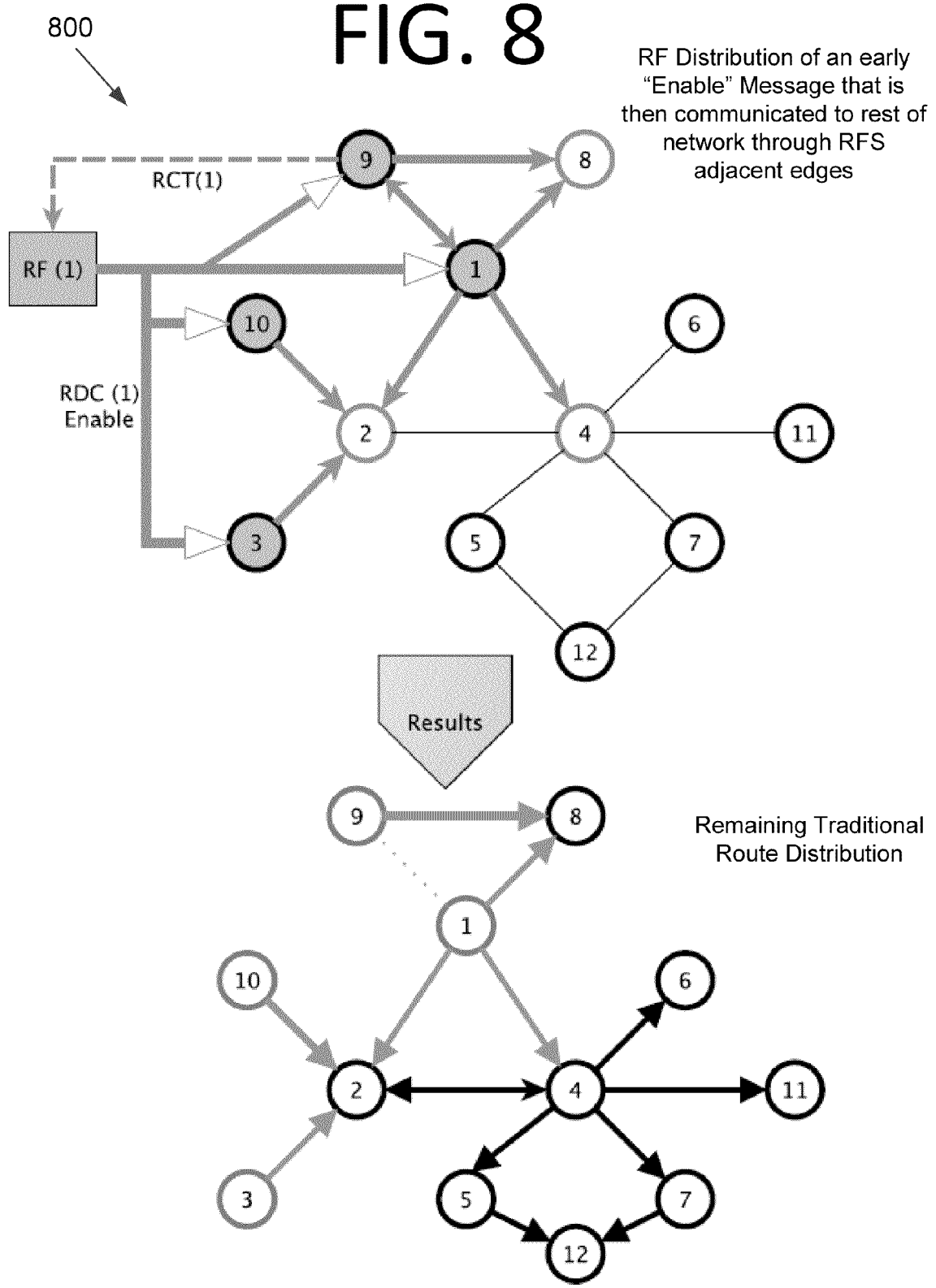
FIG. 8 illustrates the enable process on a sample network, according to an embodiment of the present invention.

FIG. 8 illustrates the enable process 800 on a sample network, according to an embodiment of the present invention. Nodes V that are RFS nodes and their neighboring nodes are provided with the enable message through the RDC. In FIG. 8, the RFS nodes are {1, 3, 9, 10}. The RFS nodes receive the enable message through the RF and, in turn, distribute the enable message through existing route information to neighboring networks {2, 4, 8}. The neighboring networks then, in turn, propagate the RF messages in a hop-by-hop process.

Through this enable process, the RFS nodes connected to the RF may be utilized to inject and spread the information to other nodes that are immediately connected to the RFS nodes. This operation has the effect of reducing the diameter of the route distribution graph as routing data only has to travel the maximum number of hops through the existing routing protocol from any RFS node to a non-RFS node. Being able to diminish the diameter of the route distribution graph reduces the convergence time of the network as other routers can learn of the existence of a new edge or the removal of an edge faster through this process than if the message was propagated throughout the entire diameter of the network while being subject to hold timers and route processing times.

Figure 9:
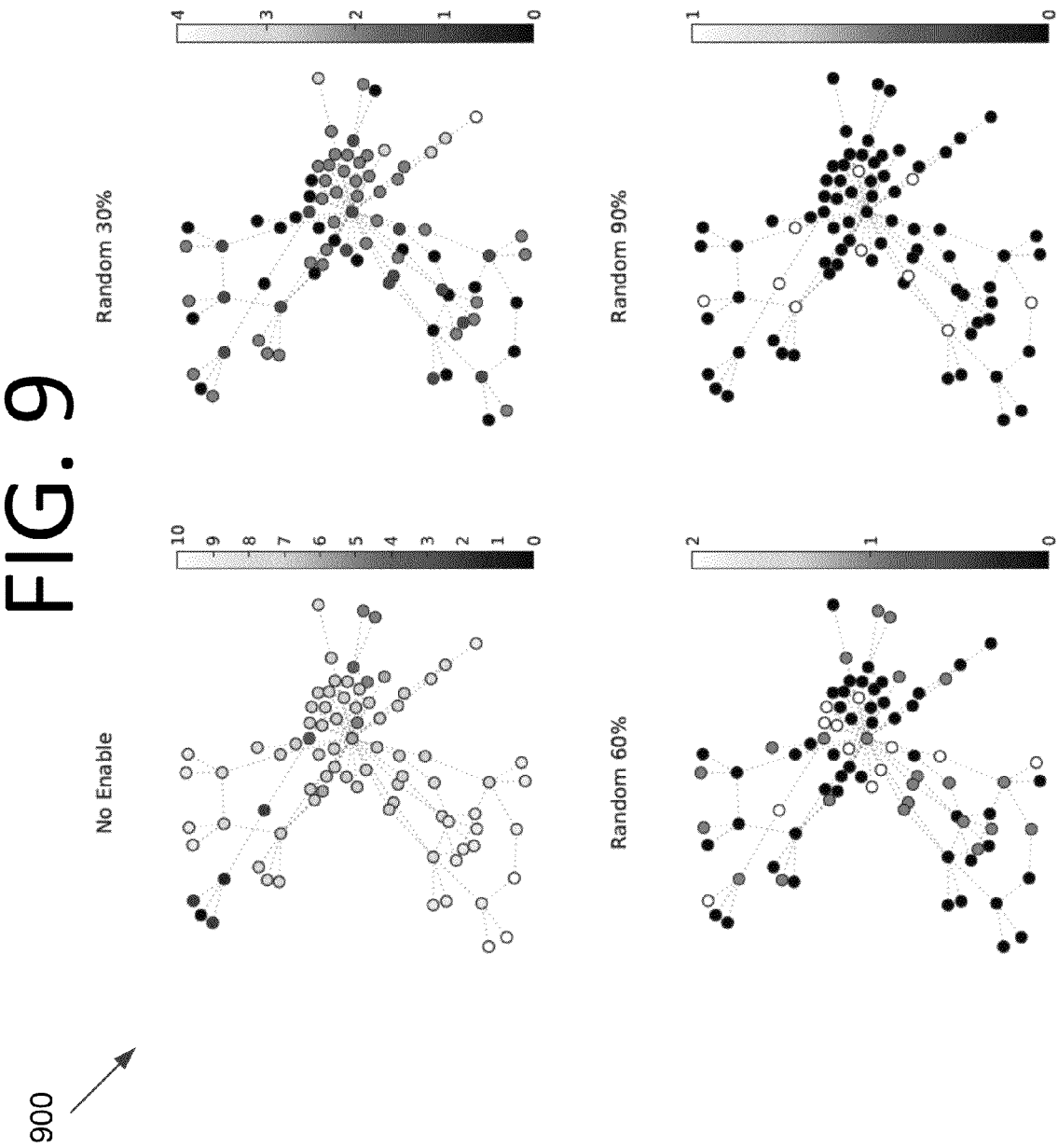
FIG. 9 illustrates dissemination of information in a network with varying percentages of randomly selected RFS nodes, according to an embodiment of the present invention.

FIG. 9 illustrates dissemination of information 900 in a network with varying percentages of randomly selected RFS nodes, according to an embodiment of the present invention. The shade of the nodes corresponds to how many transmission steps were required to reach the node with information. Nodes with the RF information were selected randomly from the set of participant nodes.

In FIG. 9, 60 participant nodes are included. The top left network depicts the number of transmission steps required in disseminating the message throughout this 60 node network, where the message distribution starts from a single node and is propagated through the entire network. For the peripheral nodes, it took 10 different transmission steps before the message reached them. The next three networks depict how this process would work differently if this message was communicated with the help of additional RFS nodes. The top right network illustrates the distance hop count if a random 30% of the nodes are selected to be RFS nodes that received this information and, in turn, distributed it to their neighbors.

As can be seen by the difference in shading, the maximum distance for the propagation is now 4 transmission steps and a significant number of the nodes have a darker shading, symbolizing being closer (in terms of hop count) to the source of the information. This process is repeated with similar scenarios of a random 60% and 90% of the nodes being RFS nodes. The benefit of having more RFS nodes is that it further reduces the diameter of the graph that the routing information must traverse.

Figure 10:
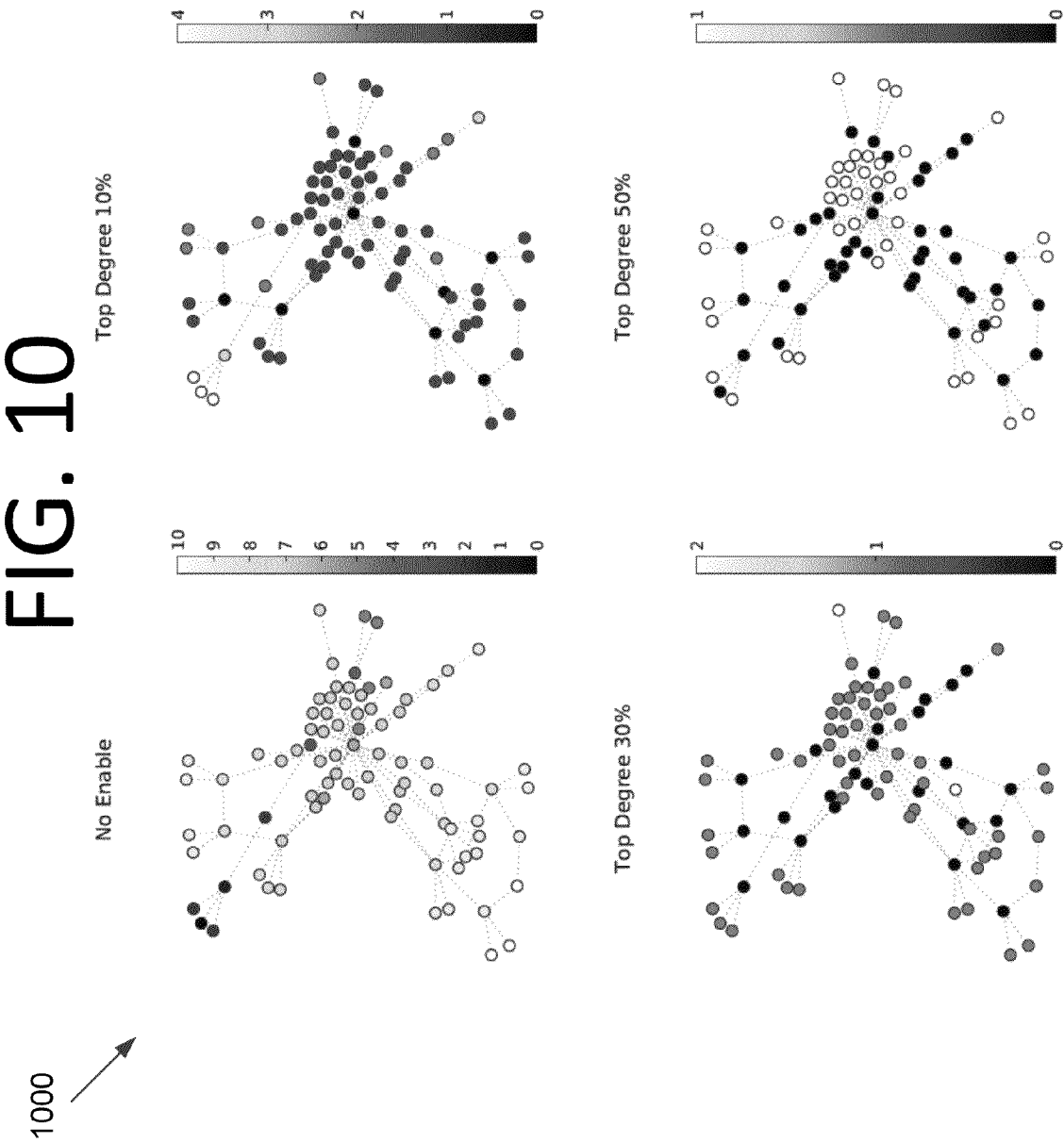
FIG. 10 illustrates dissemination of information in a network with varying percentages of RFS nodes that were selected by choosing nodes with the highest degree, according to an embodiment of the present invention.

FIG. 10 illustrates dissemination of information 1000 in a network with varying percentages of RFS nodes that were selected by choosing nodes with the highest degree, according to an embodiment of the present invention. This is a more sophisticated selection strategy than that employed in FIG. 9. In this case, node selection is prioritized by nodes with the highest number of neighbors (i.e., highest degree). However, in some embodiments, nodes may be selected based on path betweenness or eigenvalue centrality.

The nodes that were selected as RFS nodes were selected by sorting all of the nodes by their degree (neighbor count), and selecting a top percentage of these nodes to distribute the enable information. FIG. 10 demonstrates the baseline case without any RFS nodes and the cases of the top 10%, 30%, and 50% of nodes with the highest degree being selected. The legend shows that the maximal hop count for each of these cases is lower than the random selection cases, even with a lower number of total RFS nodes. Of particular note, the case of 50% shows that all nodes are neighboring an RFS node, and therefore, the diameter has been reduced in terms of message propagation from 10 to 1. This particular example illustrates the benefit of utilizing a more sophisticated selection strategy such as selecting nodes by degree, as opposed to selecting nodes randomly.

The benefits of using RF-enabled functions in partial RF usage scenarios include the following.

Convergence Time Reduction: The use of RFs has the potential for reducing the minimum number of hops a message needs to traverse before reaching all participants. Because of the RF distribution framework, the routing messages do not have to be processed and endure all of the hold timers in the traditional hop-by-hop forwarding process. Therefore, the routing messages can be transmitted with only the constraints of propagation and forwarding delays.

Reduction of Propagation Time Variation: Due to the reduced dependency on hop-by-hop propagation, different network users will generally experience less of a variance in the time it takes to receive messages from different nodes in the network. For example, in the network examples discussed in FIGS. 9 and 10, some nodes received the message in one transmission step and some nodes received the message in 10 transmission steps.

Reduction in Message Transitions and Tampering Potential: Reducing the number of times that a routing message is transmitted also reduces the potential for error or tampering. This vulnerability exists every time the message is retransmitted through an intermediary node, and an added benefit for security is reducing the number of times a message can be modified.

Distributing an enable message is an empowering concept that allows for accelerating large routing infrastructures like the Internet to also support the dynamics of mobile networking.

RF-Based Routing Data Containment Through Fragmentation

A key challenge with routed networks is preventing the spread of "incorrect" or bad information, such as in the case of routers propagating a route that doesn't exist or a routing message generated by a malicious actor. Containing the spread of fictitious information in a given network is a challenge with existing protocols as most protocols are not equipped with the ability to distinguish fictitious routing information from valid information. Routing infrastructures are intended to disseminate information and, therefore, if nodes don't know that the information is fictitious, the information will still be forwarded to neighboring nodes.

In the case of a routed network, a false routing message will spread to all the nodes that are connected to each other. A convenient way to prevent the spreading of the information is to partition the network into smaller components (fragmentation) so that the message will only be transmitted to the networks of that subcomponent and not the entire network. In some embodiments, the RF can be utilized to perform this fragmentation of the network by providing mechanisms for warning the RFS nodes of potential bad information. If the RFS nodes have been successfully warned of a bad message, they simply will not forward the message to their neighbors in some embodiments. This is the basic strategy of using the RF to contain the spread of bad information in networks where not all nodes are connected to the RF. If an ideal subset of the nodes is selected as the RFS nodes, the larger network can be successfully compartmentalized into subcomponents and bad information will only spread within those fragmented components.

FIG. 11 illustrates a network 1100 with a containment process, according to an embodiment of the present invention. FIG. 11 depicts the connectivity path of the RF informing a partial selection of RFS nodes with containment-related information. Equipped with this information from the RF, these RFS nodes will not forward the bad information any further, and therefore their edge connections are logically removed with respect to the spread of that bad information.

Because conventional routing protocols do not have constructs to receive immunization messages, nodes that are not RFS subscribers cannot receive or process warning messages about bad information. However, propagating these warning messages through the RF to the RFS nodes can effectively remove any edge adjacent to an RFS node from being utilized to propagate this bad information. If groups of non-RFS nodes are surrounded by these immunized edges, then those nodes are also immunized against the bad information unless the bad information is originated from a node in that subcomponent. This technique has the effect of reducing the spread of incorrect information even if most nodes are not equipped to listen to warning messages against this information.

Routing Fountain Architecture Applied to Inter-Domain Routing

When a given network is static with few participants joining or leaving the network, the routing infrastructure is not taxed with delivering routing information as the need for distributing this information occurs when connections change. However, as networks continue to grow both in terms of the dynamic behavior caused by mobile routing and sheer growth by the addition of participants, large networks like the Internet will need more efficient ways of distributing this routing information. Therefore, higher efficiency mechanisms such as broadcast channels may be beneficial.

The main motivating case for changing the way routing is performed conventionally is to be able to integrate an emerging set of mobile networks, such as users traveling on an airplane, to the much larger set of networks forming the Internet. Mechanisms exist for connecting network users on flights to the Internet, but these mobile users are actually not performing routing. Rather, they are borrowing mobile connectivity service from a provider network.

Figure 12:
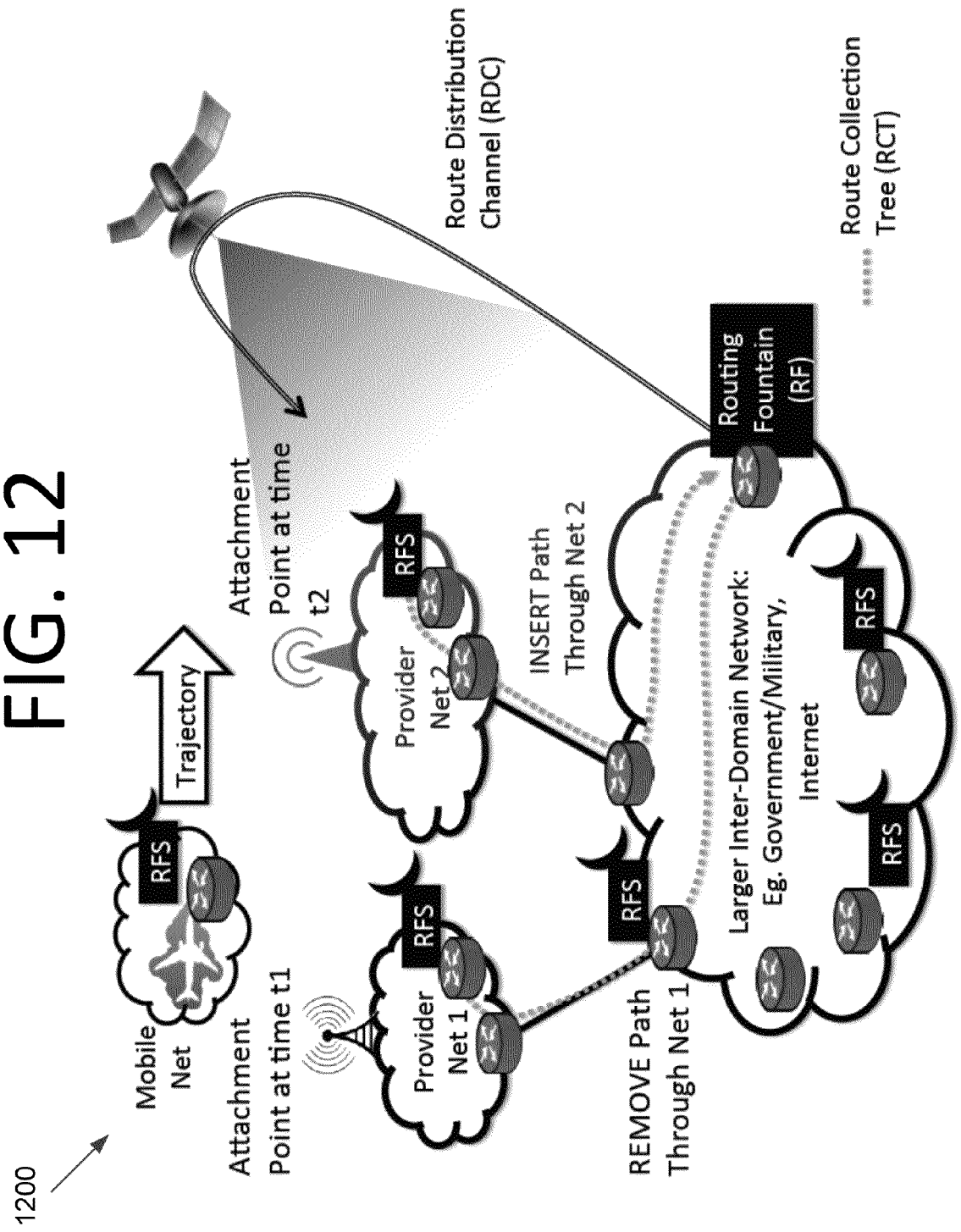
FIG. 12 illustrates an RFA approach to a network, according to an embodiment of the present invention.

RFs may be applied as an alternate mechanism for the expansion of inter-domain routing with mobile networks in some embodiments. FIG. 12 illustrates a RF architecture approach to a network 1200, according to an embodiment of the present invention. In FIG. 12, aircraft representing a mobile network is transitioning between utilizing two diverse networks as connection gateways to the larger network. Net1 is available at a time t1 and Net2 becomes available at a later time t2 due to the aircraft's mobility pattern. In order for traffic owing to the mobile network to transition from flowing through Net1 to Net2, the rest of the network should be informed of the removal of the route through the previous attachment point and the ensuing insertion of the route at the new attachment point. Upon the detection of these events, Net1 and Net2 forward routing update events directly to the RF, utilizing the RCT. The RF, in turn, takes this data and utilizes a satellite downlink to forward these routing updates to all network subscribers (RFS nodes) through the RDC. The RFS receives information from the RDC and forwards this information to other existing inter-domain and intra-domain routing processes to disseminate the received information to other routers in the same domain of the RFS node.

Exacerbating Problems for Mobile Routing

In mobile routing scenarios, the routing events associated with a node moving between networks can be generalized into events that occur when nodes attach to and detach from different networks. The event of a mobile node attaching to a gateway network generally requires distributing information indicating that the destinations of the mobile network are available through this newly formed connection, and when that connection no longer exists, the connection should be removed so that nodes no longer use a non-feasible path. Reference to these events, respectively, is made as INS (insert) and REM (remove).

To illustrate further how these routing events are propagated utilizing BGP, the sample topology of FIG. 13 may be used. FIG. 13 illustrates a $t_{up}$ event 1300, according to an embodiment of the present invention. Clouds represent individual networks and respective edge connections are depicted by the lines between the networks. Node 8 is a mobile network announcing the availability of destination A, and begins this process by sending an initial message to node 1, initiating the process of the INS event. Each neighboring node attaches its identifier to the tail of the routing message, and forwards the message to its neighboring routers. When a node receives two messages describing alternate paths to the same destination, as is the case at node 5, the node selects the shortest path to the destination and forwards that information to the rest of the network, but stores the other path as an alternative.

When a mobile network moves out of the range of a gateway network, the rest of the network should be informed of the removal of this connection possibility (an REM event). The bottom portion of FIG. 13 provides an example of this event as the edge between nodes 8 and 1 no longer exists, prompting the need to remove the previously announced route. In this case, node 1 generates a routing message announcing the loss of the path to destination A with a message—A, and each node, upon reception of this message, removes the previously received path to A as a viable alternative from that neighbor. In FIG. 13, the path 1, 3, 4 is longer than the path 1, 2. Therefore, when 5 receives the removal message from 2 (the shortest path), 5 naively believes it has an alternate path to the destination and proceeds to falsely inform the rest of the network that an alternate path exists to A along the path 8, 1, 3, 4, 5. This is not a valid path. However, the route removal messages of standard BGP do not contain enough information to deduce this invalidity, and therefore nodes initiate the propagation of a "ghost route." Eventually, as the route removal messages arrive from all destinations, nodes will retract their ghost routes, but the routing infrastructure has wasted unnecessary time and bandwidth.

Distributing and Processing of BGP Updates Through the RF Architecture

As described in the previous section, distributing information throughout a large network is influenced by the diameter of the graph and the amount of processing time at each node. To counter these effects, routing participants can utilize the RF to distribute the existence of a new edge in the network or subsequently remove the old edge.

The basic notion is that the use of the enable mechanism can leverage the RF to reduce the route propagation diameter and avoid routing protocol advertisement timers in BGP-based route propagation. In utilizing the RF, the basic mechanism involves sending the update message to the RF, which is subsequently transmitted to all subscribers. Subscribers then, in turn, will forward this new routing update to respective neighbors through the BGP process to compensate for the case where not all network nodes are recipients of RF-based distributions.

It may be assumed that each node will eventually obtain a complete connectivity graph of the network either through messages received from BGP or by listening to the RF for sufficient amounts of time to receive the entire routing table. Previous graph connectivity information is generally needed to form complete paths to the sources of information affected by updates distributed by the RF.

The two types of messages transmitted through the RF in some embodiments can be summarized as:

INSERT: This message includes the minimal announcement stating that a new edge in the graph is available, or a node is announcing a new set of destination identifiers. Upon receiving this path, the node removes the information. Upon receiving this message, a node either updates the existing path information to that destination or inserts new path information for a destination that did not previously exist.

REMOVE: This message includes the description that a given edge is no longer valid, or that a particular node is no longer announcing a particular set of destinations. Upon receiving this path, the node removes the information.

The total delay then includes the time to distribute, through the RF plug, the propagation time to the nearest RFS node. The path through the RF, if satellite-based, could incur up to a half second of delay. However, this amount of time is minimal compared to the delays of route propagation timers (i.e., minimum route advertisement interval ("MRAI")) that can potentially occur at each successive hop and vary between 10 to 30 seconds. If these types of delays can be expected at each hop, the propagation of the route through the hop-by-hop mechanism can incur hundreds of seconds of delay.

Partial Update Processing

The distribution of routing updates through the RF bypasses the formation of full path information, as is typical of messages received in BGP. Therefore, the updates that are received through the RF require additional processing before being useful to existing BGP implementations.

New Destination: Messages distributed through the RF describing the availability of a new destination generally consist of the destination address being announced and the AS announcing it. This amount of information is generally not sufficient to describe a complete path between all networks receiving this update and the source of this network. A complete path is generally needed to ensure the correctness of BGP. Therefore, to process this update, the network that receives this partial path update should utilize its previously learned information of the edges forming the connecting graph and determine if it can form a path to the network that is announcing that destination. If this procedure is successful, the receiving network generates a new BGP message with the complete path to the announcing network and inserts this information into the existing BGP routers. The routers then perform a standard BGP selection algorithm in the process with the new routing information.

New Edge: If a new edge between networks is distributed by the RF, the local RFS node may be interested in determining if this addition of a new edge will create a shorter path than the ones that currently exist in the BGP routing database. Therefore, the local RFS node may perform an analysis of all the paths to all destination identifiers and determine if the addition of this edge creates a shorter path. For the destination addresses where this is the case, a new BGP update message may be constructed with the new shortest path and this may be transmitted to the local routing processes for processing.

Remove Destination: A destination removal message states that a particular destination is no longer being announced by a network. RFS nodes receiving this type of message may simply issue a message to the local routers stating the need to remove all routing entries with that destination.

Remove Edge: A remove edge message contains information that a previously announced neighbor connection is no longer available. Upon receipt of this message type, the RFS node may perform an analysis of all selected BGP paths and determine if that edge is utilized in any of the paths. If this edge is utilized for a particular destination, the RFS node may first determine if an alternate path exists avoiding the edge to be removed edge. If this is possible, the RFS node may insert a new message with the updated path. If no feasible path to this destination is available because of the removal of this edge, a BGP remove message may be generated stating the need to remove that particular destination and the router is left with no route for that destination.

Integration of RFS into Existing Inter-Domain Networks

Figure 14:
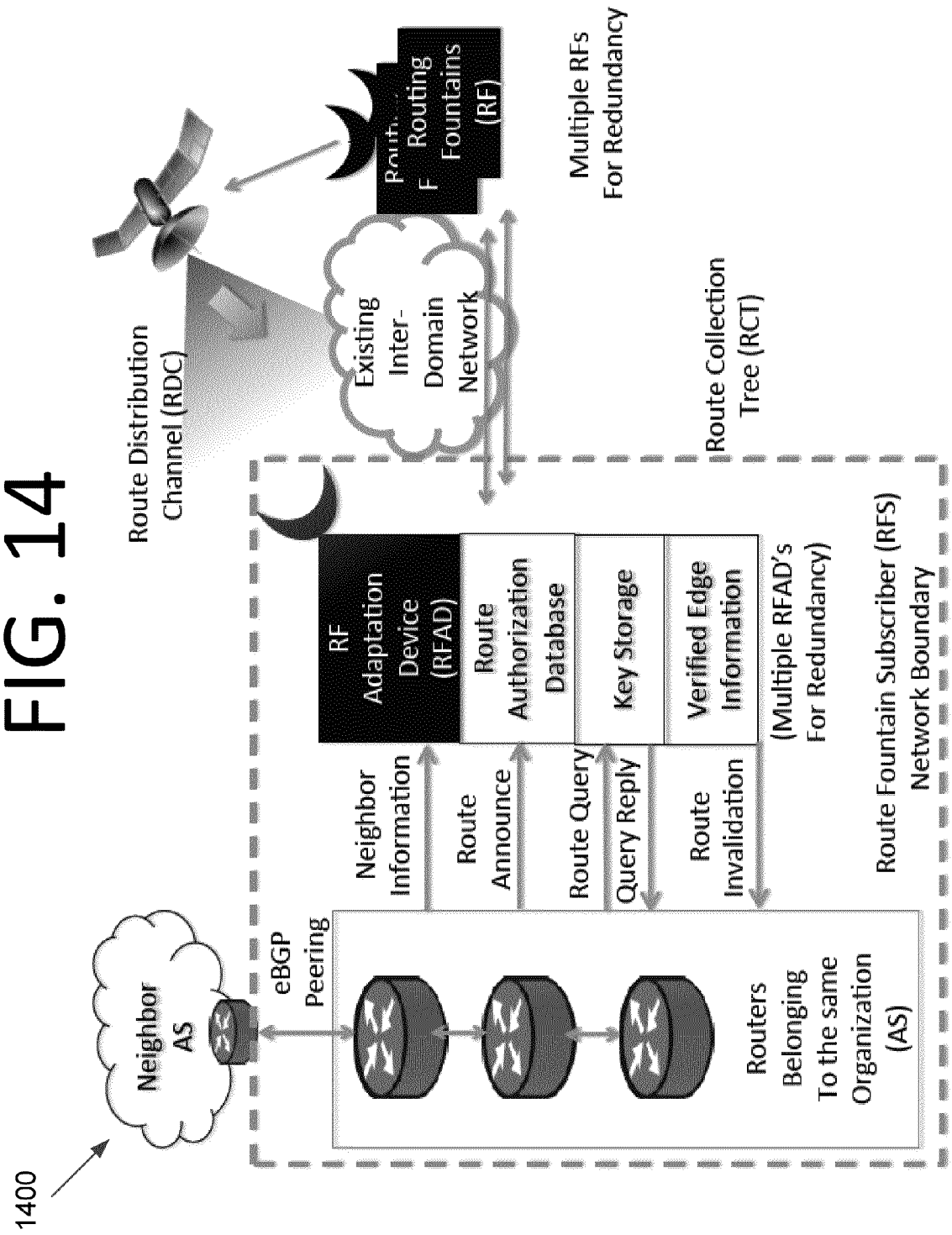
FIG. 14 illustrates an integration architecture for merging the use of a satellite-based RF architecture, according to an embodiment of the present invention.

The RF architecture may be designed to interface with existing inter-domain routing processes. FIG. 14 illustrates an integration architecture 1400 for merging the use of a satellite-based RF architecture, according to an embodiment of the present invention. In FIG. 14, the RF is connected to a satellite channel and transmits information to the RFAD. The RFAD is the interface device that integrates the RFS node to the RF architecture. The role of the RFAD is both to collect routing information from local routers and to insert information received from the RF through the satellite channel.

Routing Fountain Adaptation Device

The RFAD serves as the interface between the RFS network and the RF. As such, the RFAD should include equipment to interface to the existing inter-domain routing participants and have the equipment necessary to receive data from the satellite.

Local Network Interfaces

The RFAD should interact with the local routing processes of the network, and generally achieves this by being equipped with an IP-compatible interface, such as an Ethernet card or other network interface card capable of interfacing with the routers that form the RFS network. The RFAD can either participate in auto discovery or be configured to obtain information from the existing routers in the network. Generally speaking, the RFAD should have sufficient memory and processing capability to handle Internet-scale graph calculations. The RFAD should also be capable of receiving information from the RF transmitted through a satellite channel or other broadcast channel.

Monitoring: The RFAD device should keep status of neighboring network connections. A common mechanism for verifying the connectivity between networks is to utilize ping mechanisms that will probe the routers belonging to a neighboring organization as a way of verifying the validity of the neighbor peering session. The frequency of the pings is generally configurable and is commonly utilized to verify the availability of the links to other routers.

Protocol Interfaces: The RFAD can interact with the local routing processes by participating as a member of the iBGP family. The RFAD can also connect to other intra-domain protocols such as OSPF that provide connectivity information of the network within an organization's boundaries. Changes announced by one of the local processes can be received by the RFAD and then forwarded to the RF. Routes can be inserted into BGP-compatible servers through the use of the route-map interface originally designed for use with route servers.

Routing Fountain Design

Figure 15:
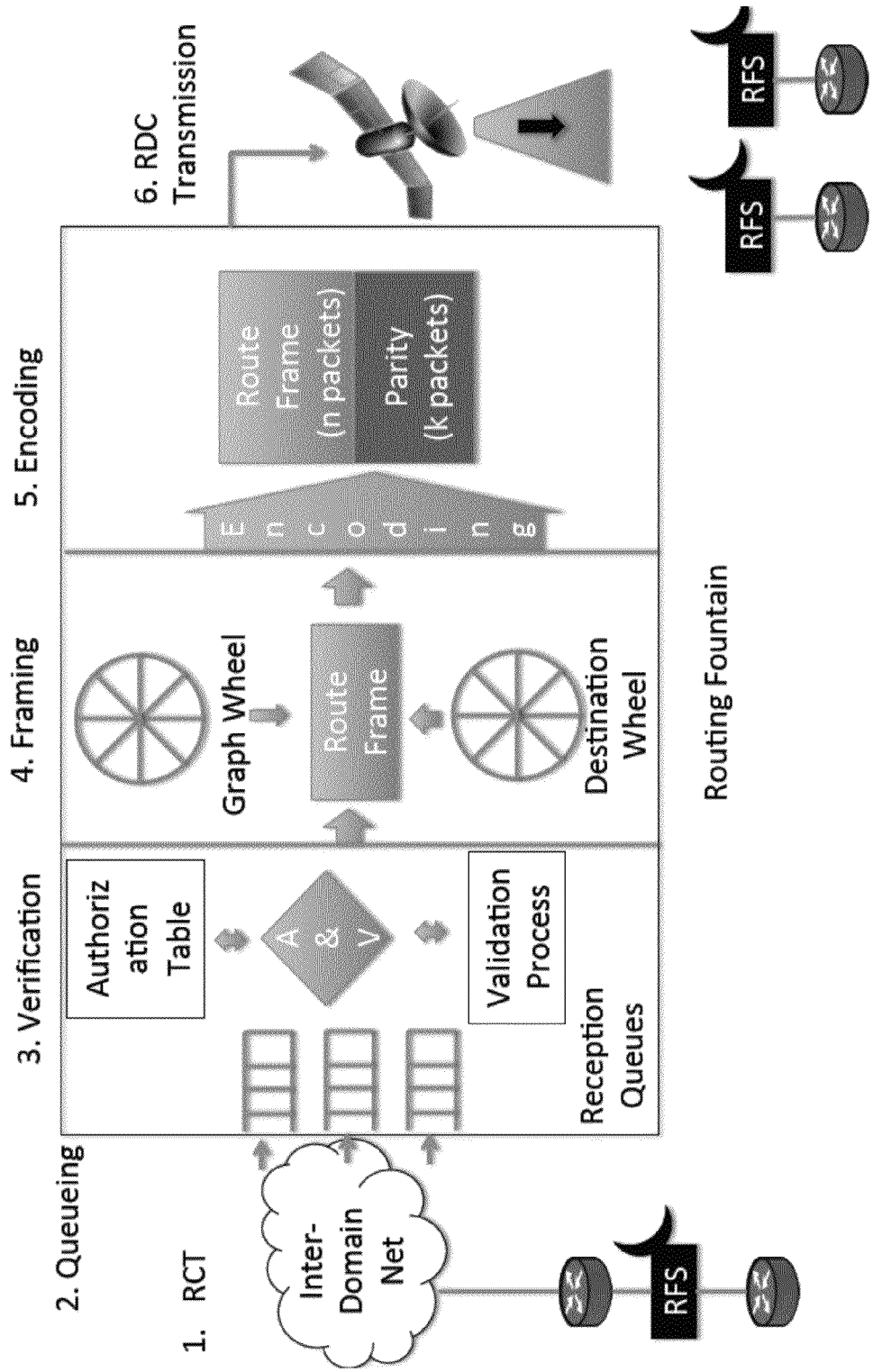
FIG. 15 illustrates the main data flow of data as it traverses the functions incurred by the RF, according to an embodiment of the present invention.

Each RF device is tasked with the collection, validation, and distribution of routing information to a set of RFS nodes. FIG. 15 illustrates the main data flow 1500 of data as it traverses the functions incurred by the RF, according to an embodiment of the present invention. These functions are described in more detail below.

RCT Ingress

The RF utilizes the existing network connections to receive information from RFS nodes utilizing the RCT as the path for receiving this information. RFAD nodes establish a TCP connection with the ingress set of IP address of the RF node. This implies that the intermediary network should have the ability to send traffic to and from the RFAD device and the RF. This path does not require the standard processing of routing messages and therefore, only endures simple forwarding and propagation delays where a forwarding delay typically is on the order of a few milliseconds (ms) and propagation delays are typically in the tens of ms, but may extend to a few hundred ms for satellite and inter-oceanic links.

Queuing

The RF serves a much larger number of RFS nodes and should create valid mechanisms for handling bursty amounts of routing information. The amount of processing that a RF can accomplish is ultimately limited by the downlink rate of the RDC, which, if a leased satellite link is used, is typically a fixed bandwidth size. Therefore, if the RF receives a simultaneous burst of information from multiple participant nodes, the RF should queue these updates until the RF has the capacity to service those updates.

Three cases exist for queuing in the RF:

No Queuing Necessary: The RF is currently not processing any updates, thus the update is immediately processed.

Item is Placed in Queue: If during a period of time the number of updates received at the RF device exceeds the capacity of the RF device, the messages will be queued.

Queues are Full Reject Updates: The RF may reach the condition that the RF has no capacity to store or process the routing information. This is an undesirable condition, but the RF could choose to reprioritize the items in its current queue or notify the RFS node that its update cannot be serviced due to space limitations.

Authentication and Data Integrity

Once data is allowed into the RF, the data should be inspected prior to forwarding the information to the subscribers. This process generally requires mechanisms for the following tasks:

Authentication: A key component of the RF is being able to identify and validate that a node is indeed who/what it claims to be. The typical process is to utilize private and public cryptographic keys that have been validated by a third party. This methodology is commonly used today for identifying websites to various users through Secure Sockets Layer ("SSL") sockets.

Authorization: Once a user can be authenticated, the RF should also check through a series of tables if that RFS node is authorized or has the proper permissions to distribute the information. This authentication information can be obtained from Routing Information Registries ("RIRs"), for example.

Data Integrity: The integrity of the data can also be verified by the use of HMAC hashing algorithms and cryptographic keys. Prior to the transmission of the information, the RFS node may perform a hashing function on the data and then encrypt the signature with its private cryptographic key. The RF node then may decrypt the signature, perform the same hash on the received data, and compare the results of the hashes. If the hashes match, the data has not been tampered. If the hashes do not match, there is a potential that the data has been tampered.

A key component of this routing process in some embodiments is being able to uniquely identify the networks that are sending information. This bidirectional communication is possible through the use of SSL sockets or Transport Layer Security ("TLS") sockets. SSL has defined mechanisms for using either a pre-shared key or a public-private key pair to perform mutual authentication of the RFS nodes and the RF. Prior to establishing this type of connection, these keys should be distributed through a third party validation system utilizing other forms of documentation, such as organizational identification, before a key is assigned.

Validation and Verification

This section of the RF processing chain is the process of identifying which updates should be sent to the receiver nodes and which updates shouldn't. Mechanisms may be used to validate the validity of different events with the goal of providing a true operating picture of the network. Some examples are provided below.

Corroboration

Edges in a graph describe the connection between two nodes u, v. If each node with an edge change is required to inform the RF of the edge change, this would result in two messages being received at the RF. To ensure the consistency of the announcement of an edge u, v, the RF node should expect an announcement from both u and v prior to forwarding the announcement.

Sequence Numbers

Updates generated by each of the nodes that are sent to the RF should be labeled with appropriate sequence numbers. The sequence numbers should be utilized to distinguish which messages correspond to the same events or different events. If an RF receives the same message from multiple locations, but with the same sequence number, the RF can determine that this series of messages is being caused by the same event.

Data History Wheel

The RDC in many cases will be a dedicated satellite channel with a fixed data rate. Routing updates will be received sporadically based on connectivity changes of subscriber networks. To fill this idle space in the transmission line, data history wheels may be used that can fill idle satellite capacity by redistributing information. This mechanism serves to provide updates in case a RFS node did not receive a message the first time it was transmitted, or in cases where a network recently joined as a participant.

In the particular case of RF design, the data history wheel mechanism can be utilized to retransmit the existing graph edges and destinations that have previously been announced so that networks that have recently joined the network can listen to this stream of information and receive this information. The basic mechanism is to utilize the idle time on the transmission line to stuff empty space on the transmission channel. After the entire database has been transmitted, the transmission cycle will repeat and the data will commence again.

This data history wheel mechanism may be useful in:

Distributing Cold Start Information: When a node begins its participation in the network, the node can listen and will gradually learn all of the information that has previously been transmitted. This will provide the node with the necessary information to form paths for the route INSERT process.

Database Refresh: Listeners can persistently verify the consistency of their local information by verifying that their local copy is in sync with the data being transmitted on the data wheel.

Node Recovery: RFS nodes can utilize this mechanism to retrieve information that may have been lost during the first transmission.

An example of this scenario can be taken from the existing Internet that consists of approximately 100,000 edges and 400,000 routing entries consisting of approximately 500,000 updates to form the entire graph and destination map. If a given RF can transmit 1,500 entries per second, it will take 500,000/1,500=333 s to retransmit the entire set of information. In this particular case, the full current state of the network will be retransmitted approximately every five-and-a-half minutes.

Loss Compensation

The basic mechanism utilized to compensate for losses on the distribution channel is to send additional parity information. The amount of additional parity information that is sent depends on the number of subscribers of the network, as it is assumed that if there are more recipients of a broadcast signal, there will be a higher number of recipients that will experience a loss of the information. The basic process for adding parity information is to take an original message of size m, divide it into n packets, and transmit an additional k packets. If the recipients of this signal can receive any n of the total n+k packets, then the message can be decoded appropriately.

The probability can be described as:

$$P_{FEC} = \sum_{i=n}^{n+k} \binom{i}{n+k}(1-p)^i p^{k+n-i}$$

where p represents the probability of losing a packet. The main optimization of this technique is not to send too much parity information as this is considered a wasted resource, but to send just the right quantity to compensate for the expected loss of packets. These techniques are generally well understood and can be utilized for the tuning of a network based on loss probability and the number of participants.

RDC—Broadcast Physical Channels for Route Distribution

A key gain in the use of the RF architecture is the ability to leverage broadcast communications to distribute information. For example, some of the broadcast mediums that may be used for creating the RDC include, but are not limited to, satellite links, localized radio frequency channels (e.g., WIMAX and LTE), and exchange point gigabit Ethernet. It should be noted that in order to gain full coverage of the entire Earth with satellite embodiments, at least three satellites must generally be used.

RCT Design

In designing an RCT, an existing network may be utilized or direct RFS-to-RF connections may be used.

Existing Network: In the case where the RF is being utilized to increase efficiency for an existing network, data can flow along the same paths as other data flows of the network. As such, only the delays associated with forwarding a packet will be encountered, instead of the delays associated with processing and forwarding routing information. In the case of utilizing the RF prior to any existing routing infrastructure, this generally requires manually creating bidirectional forwarding trees with designated upstream forwarding interfaces towards the RF. In these cases, each RF forms a minimum spanning tree to each of its RFS nodes. The creation of these trees requires explicit state information in the underlying network. The amount of this state information is created not on the order of subscribers, but on the order of RFs.

Direct RFS-to-RF Connections: In this methodology, dedicated connections can be created to uplink data to the RF, such as dedicating separate ground-based leased line connections through ISDN or POTS lines, or having the capability to uplink through the satellite connection. Although likely costlier, the advantage to this approach for creating the RCT is that it facilitates an additional data path from the RFS nodes to the RF, and is therefore not subject to the dynamics of the underlying network. This restriction generally increases the cost of using the architecture and is not required for proper operation.

RCT Bootstrapping

The existence of a communication pathway is generally an essential requirement of the RF architecture, and therefore in scenarios where no routing protocol or prior network exists, the RCT should be created explicitly. This can either be done physically, such as mentioned above with a physical connection from the RFS nodes to the RF, or can also be done through the manual creation of a shortest path forwarding tree to each RF.

RCT Flow Control and Error Correction

The RCT may assume the existence of a bidirectional data path between each RFS and the RF. Because this communication is intended to go directly to the RF, existing transport protocols are well-suited for these tasks. TCP has inherent mechanisms for adapting the rate at which the RFS nodes send information, as well as for retransmitting packets of information that may have gotten lost.

Bandwidth Constraints

The RCT interface to the RF may have a natural limitation in the bandwidth and should be adequately sized to accommodate for the envisioned number of updates that will be received. The most significant factors in this constraint are the number of RFS nodes that will be subscribed and the frequency of the updates.

RF Service Activation and Operation

The following sections describe the general steps involved in establishing a network to utilize the RF to receive and distribute routing updates the neighbors, according to some embodiments.

Collection of Local Routing Information to Send to the RF

A primary function of each RFS node is to send local connectivity information to the RF. To accomplish this, the RFAD is tasked with collecting information from the local routing protocols that it interacts with. The relevant information may include, but is not limited to:

Active Neighbor Information: As part of communicating the active edge information to the rest of the network to form a complete graph picture G reflecting the actual physical connections of the network, active neighbor information is used. For this task, it is important for the RFAD to interact with the local network to communicate the existence or removal of any edges.

Active Routes the RFS is Originating: Each RFS is responsible for announcing routing announcements from inside of its domain that are also being communicated to neighboring routers.

Miscellaneous Routing Information: Additional information that may be of interest to other nodes in making routing decisions would be the load capabilities for of each link, specific policy information, or information indicating that the network is under duress. In the future, networks will likely require this type of information to be further resilient against various types of network attacks.

These functions can be achieved by configuring the RFAD node to collect information as an iBGP peer, similar to other routers in the local domain exchanging their routing information.

RF-Based Distribution Process

The steps in the RF-based distribution process may include the following in some embodiments:

(1) The RF is established and interfaces to an existing network core to receive data plane connections.

(2) An organizational relationship is established between the RF hosting organization and the subscriber network demonstrating the intent of utilizing the RF routing service.

(3) The client organization is provided with a RFAD and is configured to collect routing information from local routing processes.

(4) The RFAD establishes a network connection with the RF on the RCT and verifies the reception of data from the RDC.

(5) The RFAD detects internal connectivity changes from internal client network and transmits transmitting routing information change to the RF.

(6) The RFAD receives information on the RDC, filters relevant information, and generates messages to local routers with routing changes.

(7) The RFAD maintains connectivity with the RF, confirming the existence of the RFS node and the viability of its routing information.

Steps 4 and 5 may occur for every event that causes a change in the local network connectivity. Steps 7 and 8 may occur continually while the organization is subscribed to the RF.

Collection and Summarizing of Information

The primary task of the RF is the receiving, processing, and forwarding of the information from all of the RFS nodes. For this task, the RF should have sufficient incoming network capacity to handle the streams of data from a larger quantity of RFSs. The RF can utilize the reliability and the flow control mechanisms of TCP to control the rate of incoming information.

Routing Fountain Behavior

The RF can also provide a high value service in summarizing the information received by not generating duplicate messages for the same type of information. This function is generally necessary to not send out the same messages if multiple RFS nodes generate this information. Pseudocode for the RF behavior may be as follows:

Establish RF;

```
while (RFinservice)
{
    Receive Connections from RFS nodes;
    Process incoming Data from RFS nodes;
    Distribute Data on RDC;
}
    Pseudocode for RFS behavior may be as follows:
Establish RFS;
Initialize Connection to RF;
Establish Connection to Network;
While (RFSinservice)
{
    ProcessDatafromRDC;
    if (Data Relevant to Attached Network)
        Generate Message to AN;
    if (NewDatafromNetwork)
    {
        Process incoming Data from Attached Network;
        Send Data to RF;
    }
    else
        Send Keep-Alive Message;
}
```

Validation and Corroboration of Information

A feature of the centralized architecture of many embodiments is that the RF is in a unique position to validate that the information being sent is indeed valid. The first stage of validating information is validating that a RFS node that is making a particular routing announcement is authorized to accomplish this task. This first stage of validation can be accomplished during the establishment of connectivity on the RCT, as described above. To achieve this goal, the generator of information should corroborate this information with information that is generated from authorization databases such as those run by RadDB and other organizations that record which nodes are authorized to generate information to which destinations.

In order to achieve this process of validation, a sequential series of steps is involved, including authentication and checking of node authorization for generating the message.

Authentication: The first step is authenticating that the RFS node is indeed a representative for the attached network. Each RFS node is uniquely identified by the establishment of the a secure TCP session utilizing PKI. In this infrastructure, each RFS node is allocated a pair of keys: a public and a private key. The private key is utilized to generate messages, which, in turn, can be decrypted only by a unique public key. Similarly, the RF is allocated a set of public and private keys to validate its authenticity. Each RFS node is equipped with knowledge of the RF's public key, and in turn, provides the RF with its own public key. The distribution of the keys should be done with a third party process involving a non-electronic validation that the RFS node indeed corresponds to this network.

Authorization: After the identity of the RFS node has been authenticated, the RF may then proceed to verify that the RFS node is authorized to make the announcement. This is true primarily in the case of verifying that an attached network has been authorized to announce a set of IP addresses. This process is done through an organization called IANA in North America, which in turn authorizes the RIRs to administer different numbers. There are five or six other regional Internet registries. Similar processes have been utilized with the use of routing databases.

Query Response

In this function, routing processes throughout the network query the RFS nodes for validation information. For example, routers may ask questions of the form: "Is this a valid path to a particular destination?", "Does node A own the ability to originate this route?", etc.

Current mechanisms for this type of active querying are not readily implemented into routers under development by large vendors such as Cisco® and Juniper Networks®. However, routers do store configuration information in the form of preallocated policy maps, so although current routers do not have an application programming interface ("API") to query an outside device, they can be configured to check routing information against a locally stored permissions table. In the near term, the RFS node may simply fill this route map information with the information received on the RDC.

Invalidation of Current Routing Information

In this function, the RFAD performs an early notification and alert function essentially notifying routing processes residing within that organization's administrative domain that a previously distributed item of information is no longer valid. This type of information could include the existence and availability of certain nodes originating destinations or the removal of a graph edge, as in the case of neighboring routers no longer having a connection.

This task can be accomplished through configuring active route maps. If a router does not have route map functionality, the router can accomplish this through having the RFS node configure the local routers as a CLI session.

State Validation

The RF architecture is responsible for maintaining keep-alive communication with the RF. If communication with an RFS node becomes inactivated, the RF cannot assume the validity of any of the information that the RFS node has provided, and therefore should notify other subscribers of this condition—essentially recanting all information the RFS node has previously transmitted.

Mobility Scenario and Multiple Broadcast Domains

Figure 16:
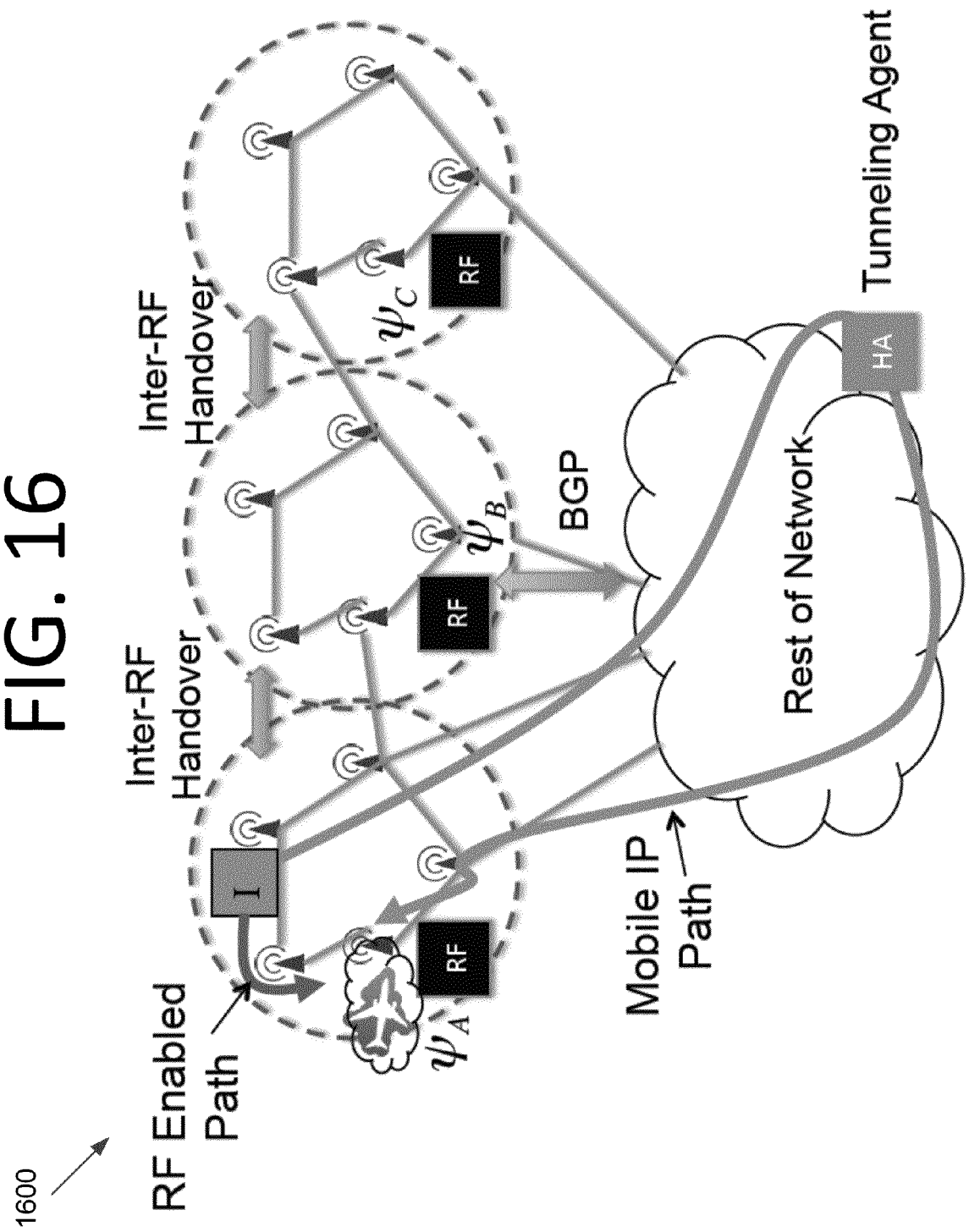
FIG. 16 illustrates a network where multiple RFs cover different geographical areas containing ground-based wireless access point towers providing network connectivity to a mobile network ("MN") of an aircraft, according to an embodiment of the present invention.

RFs may provide shortest path convergence within a geographical area containing both a source and a destination of the traffic for mobile networks ("MNs"). FIG. 16 illustrates a network 1600 where multiple RFs cover different geographical areas containing ground-based wireless access point towers providing network connectivity to a MN of an aircraft, according to an embodiment of the present invention. The path shows path length differences sending traffic from I to an aircraft utilizing Mobile IP and RF-based routing. RF-based routing can facilitate a shorter path as it informs all nodes within its transmission area of the availability of shortest paths.

In this scenario, a MN is traveling along a given geographical trajectory via the aircraft. Here, the scenario is used where an aircraft is traversing up the west coast of the United States. As the aircraft travels, it will come within range of different mobile radio towers that can serve as access networks to the Internet. In this scenario, the aircraft may traverse between attachment points of many different network providers, and therefore would like to use BGP to maintain connectivity as the aircraft travels, leveraging multiple access networks.

In this scenario, three RFs are pictured as having constrained coverage areas that are distributed geographically along the west coast of the United States. The circles in the drawing represent the reception range of three different RFs labeled $\phi_A$, $\phi_B$, and $\phi_C$—notionally, the coverage ranges of California, Oregon, and Washington, respectively. All of the attachment points within a coverage circle can receive the broadcast messages of the RF and will also use this mechanism to inform other networks of connectivity changes, such as when a MN connects or disconnects from that network.

As the aircraft travels, it connects to various towers and establishes a BGP peering relationship with its attachment point. The establishment of this relationship is sent to the RF and subsequently broadcast to all recipients within that coverage area. Each node within that coverage area can use that update plus connectivity information of the rest of the nodes in that coverage area to form a shortest path to the MN through its most recent attachment point, and place that entry into the node's routing tables. In this way, all of the nodes within the broadcast range of an RF can form shortest paths to the MN as it moves through different attachment points within the geographical area capable of receiving the broadcast channel of that particular RF. This type of transition is referred to as an intra-RF handover.

Eventually, the MN may travel beyond the broadcast channel range of a single RF, and will make a transition into the range of a different RF. This scenario also illustrates inter-RF handovers that occur when the mobile node moves from an attachment network served by an RF, for example, to a network served by a different RF, such as from $\phi_A$ to $\phi_B$. In order to facilitate a traffic forwarding path during these types of transitions, these RFs should coordinate activities as this transition involves nodes not within their own broadcast area.

The key advantage to utilizing the RF is that it is a mechanism for facilitating connectivity to the rest of the network, but also maintains the shortest path reachability with a single message transmission. Although the transmission range of a single RF may be limited, it provides the opportunity to facilitate the shortest paths between nodes that are geographically close, which is the worst case for tunneling protocols such as mobile IP. FIG. 16 illustrates this phenomenon by showing how a network labeled "I", although geographically close to the MN, must send all traffic to the home agent ("HA") in order to reach the MN.

For nodes that are in another extremity of the network, forwarding traffic to the HA may not be a significant path increase, but for nodes that are geographically close, it is. In contrast, the RF-enabled path between I and the MN is much shorter. These types of scenarios illustrate opportunities where utilizing the RF-based broadcast channel can significantly reduce the network-based delivery paths for mobile network traffic.

RF-Assisted Mobility

As an improvement to current mechanisms for transitioning traffic through mobile events, use of the RF for transitioning traffic destined to a MN may be beneficial as the MN traverses between multiple attachment points in the network.

The use of the RF provides the following opportunities to improve upon current routing techniques:

Improved Path Optimality: The key benefit for the use of the RFs is the improvements in path optimality. The RF distributes the needed information to enable data to traverse along the shortest possible path between any two network hosts served by a common RF. Shortest path connectivity is only guaranteed if all participants are aware of all possible connections, and the RF is very efficient at broadcasting connectivity information to all participants.

Synchronized Transitions to Reduce Transient Times: There are physical limitations to how fast data can travel and how fast information is propagated. A key approach to overcoming these physical limitations is to leverage predictability to reduce losses during transitions. Currently, network mobility protocols are agnostic to how long it will take for a network update to traverse the entire network. In the current Internet, this could be a few seconds, or in some cases, a few hours. If the RF can provide a high confidence estimate of how long this update process will take, nodes can make a decision to move at a precise time to minimize losses.

Reduced Control Message Costs: The amount of network bandwidth required to maintain connectivity for a mobile network grows both when the network becomes larger and when the network becomes more mobile. Therefore, just in terms of the amount of traffic the network is required to maintain, it is compelling to find more efficient mechanisms of distributing this information. The use of a common broadcast channel where all networks can simultaneously be informed of changes with a single transmission is much more scalable than flooding-based message dissemination.

Intra-RF Handover Messaging Sequence

Figure 17:
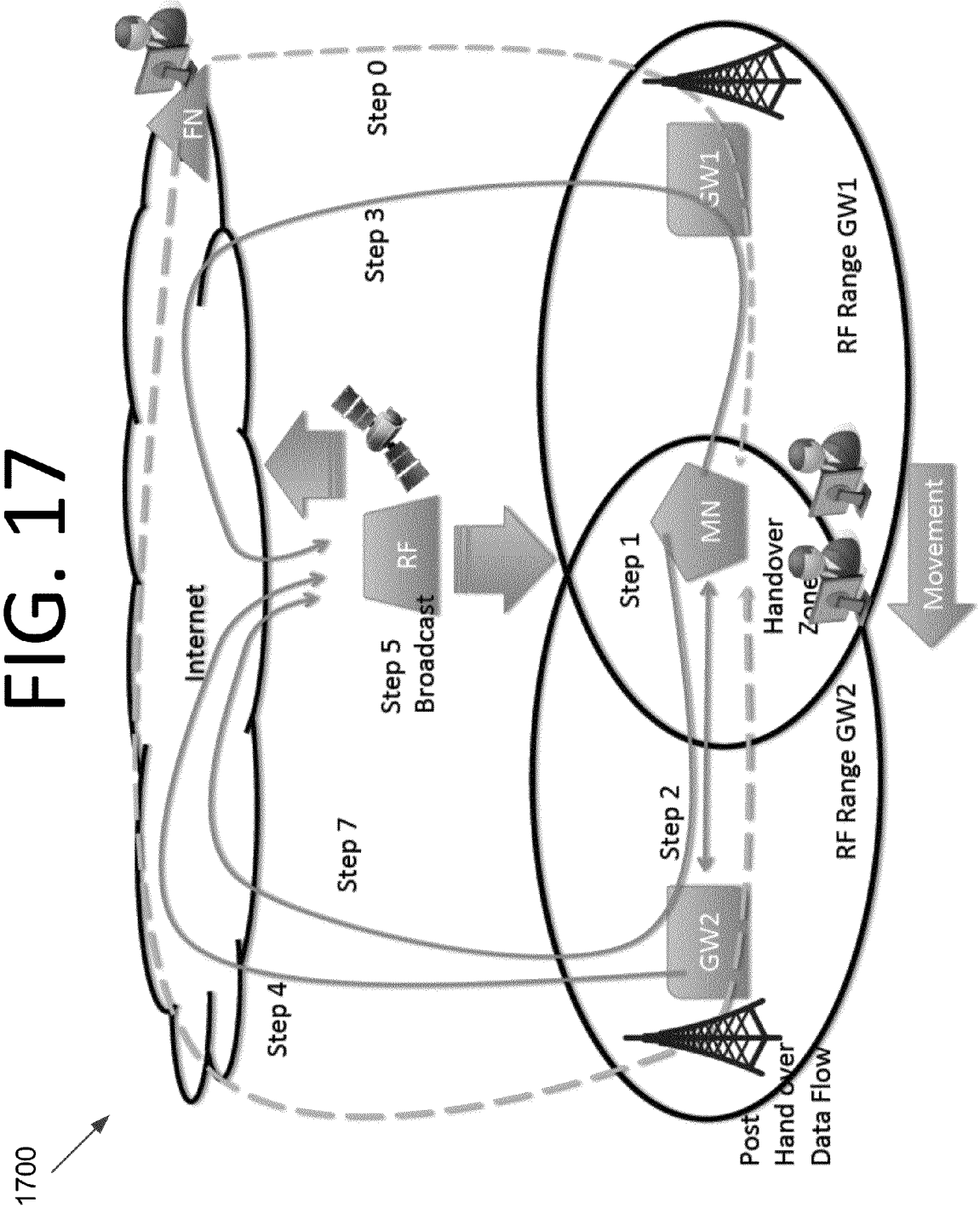
FIG. 17 illustrates a scenario where a mobile node has detected the existence of a new network connection point and the wireless signal is becoming stronger as the mobile node approaches GW2, according to an embodiment of the present invention.

FIG. 17 illustrates a scenario 1700 where a mobile node has detected the existence of a new network connection point and the wireless signal is becoming stronger as the mobile node approaches GW2, according to an embodiment of the present invention. The RF is used to perform a handover between two different towers acting as gateway networks GW1 and GW2. The mobile node therefore determines that it is prudent to begin the process of transitioning data from GW1 to GW2. The transition allows connectivity to be maintained between the fixed network ("FN") user and the MN user.

The steps required to make this transition utilizing the RF in some embodiments are as follows:

(1) The MN detects the presence of new network attachment point GW2.

(2) The MN communicates with an attachment point (GW2), confirms intent to utilize GW2 as a network gateway, and initiates a route peering session.

(3) The MN communicates to the RF the establishment of connectivity to GW2.

(4) GW2 informs the RF of establishment of connectivity to the MN.

(5) The RF generates a message announcing new link between the MN and GW2.

(6) After receiving confirmation of a routed path through GW2, the MN informs the RF of breaking connection with GW1.

(7) The RF sends a REMOVE message for edge MN-GW1.

In many cases, the MN will not be equipped with two wireless networking devices, but will still need to transition between two gateway networks. Preventing all packet losses in this scenario is difficult because neither connection will be active during the transition period. The amount of packet losses during this time can be minimized by synchronizing the time period when the mobile network will make the transition and the time when the rest of the network will receive the transition message. This process can occur in general by preparing for the transition with the new attachment point, and then scheduling the transition message to occur at a given time t. Knowing the RF takes a time period $\epsilon$ to deliver the message, the MN makes the transition at t+$\epsilon$.

Inter-RF Area Mobile Handovers

The coverage area of a particular RF will have geographical limitations, and therefore it is conceivable that a mobile node may need to make a transition between two network points that are part of the same connected set of networks, but are not subscribers to the same RF. Consider an example with a current attachment point node, a future attachment point node, and a mobile network that would like to make a network transition between these two attachment points with minimal packet losses. This process is not possible through simply inserting and removing an edge through the RF as the different attachment points are being serviced by different RFs.

Without knowledge of a complete path between the attachment points, the RF cannot guarantee transitions. For this purpose, the peer and parent/child relationships between routing fountains described above are utilized. These mechanisms allow peering RFs to have extended visibility of network connectivity beyond what their own subscribers provide by receiving edge updates from other RFs.

Transition Paths

Both the parent and the peer RF mechanisms provide the opportunity for the RF nodes to have a larger knowledge of the network then what is distributed to the RFS nodes. With this knowledge, RF nodes can facilitate node transitions beyond the broadcast range of any individual RF. To achieve such transitions, the extended knowledge is utilized to form a complete path between the two networks that are being served by different RFs, and then a message describing this transition path is sent to all the participants of the peering RFs. Network participants that are explicitly named in the path are instructed specifically which neighbor to forward traffic towards. Other participants will utilize local knowledge and form a path to each of the nodes on the transition path, select the shortest path, and forward information along that path. In this manner, all traffic between the previous and future attachment points is directed towards the new attachment point.

The basic procedure begins with an RF being informed of a planned transition of one of its subscribers from a current attachment point to a future attachment point that is not an RFS node of that RF. Upon detecting this condition, the RF will search its extended knowledge received from the RFS node to attempt to form a path between the transition attachment points. If the RF has enough graph knowledge to form a path between the points, the RF will then generate a transition edge path message that includes a known complete path with the information <destinationid, networkid, path(a, b)> and send it to all the RFs participating in the peering relationship. Each RF will then forward this transition message to its sets of RFS nodes.

RFS nodes that are explicitly named on the path are directed to forward traffic along the transition path for that particular destination. In this way, no routing loops are created as all nodes are simultaneously forced to send the traffic along the specified path. RFS nodes that are not on the path will forward traffic for that destination to any of the nodes explicitly named on the path.

Routing Security and Routing Fountain-Based Protections

It has been long understood that the current routing infrastructure of the Internet is vulnerable to undesirable manipulations by misconfigured or misbehaving participants of the routing infrastructure. The result of these manipulations can lead to situations where network traffic sent to a victim organization is diverted and never reaches the intended organization or traffic is diverted through a third organization that has the opportunity to modify that traffic as it is in transit. Although encryption techniques are sufficient for protecting data exchanges so that data is not tampered, the problem with routing is more complicated in that not only should the message be protected from being modified, but also the system should protect against illegitimate hosts misrepresenting information to others—in other words, the system should determine which organizations are lying to rest of the network.

Many in the networking community would agree that the challenge to securing the Internet is not for the lack of technical solutions. Rather, the challenge lies in implementing a solution as it involves changes to current methods of performing routing. A key piece of the problem is that routed networks depend on the truthfulness of every participant in order to ensure "correct" behavior. Because of this, most solutions require uniform acceptance of a particular security mechanism and will not work until all users are committed to a particular solution. To further complicate matters, current practices and algorithms for securing digital information require some sort of third party key validation infrastructure, and selecting this third party organization is another area where many have yet to reach agreement. Towards this goal, the RF architecture may be used as a tool for deploying incremental security of the routing infrastructure. The basic approach is to utilize the RF to deliver validated routing information to the participants instead of only relying on the information distributed by the traditional routing propagation patterns of BGP. Organizations that receive this information from the RF can detect invalid routing announcements received through BGP and will not forward this fictitious information to their neighbors, therefore hampering the effectiveness of malicious actors.

This serves as a way of containing the dissemination of fictitious routing information by containing its dissemination with networks that can receive information from the RF. A few of the most attractive features of utilizing this approach are: (1) that the RF provides a natural third party verification infrastructure that also serves as a high efficiency distribution mechanism; (2) that an incrementally deployable security infrastructure is provided with increasing protection levels as more nodes are equipped with the mechanisms; and (3) the dynamics of a mobile routing environment can be supported and the volume of traffic generated during routing events in Internet-sized networks can be reduced.

Using Routing Fountains for Secure Routing

Figure 18:
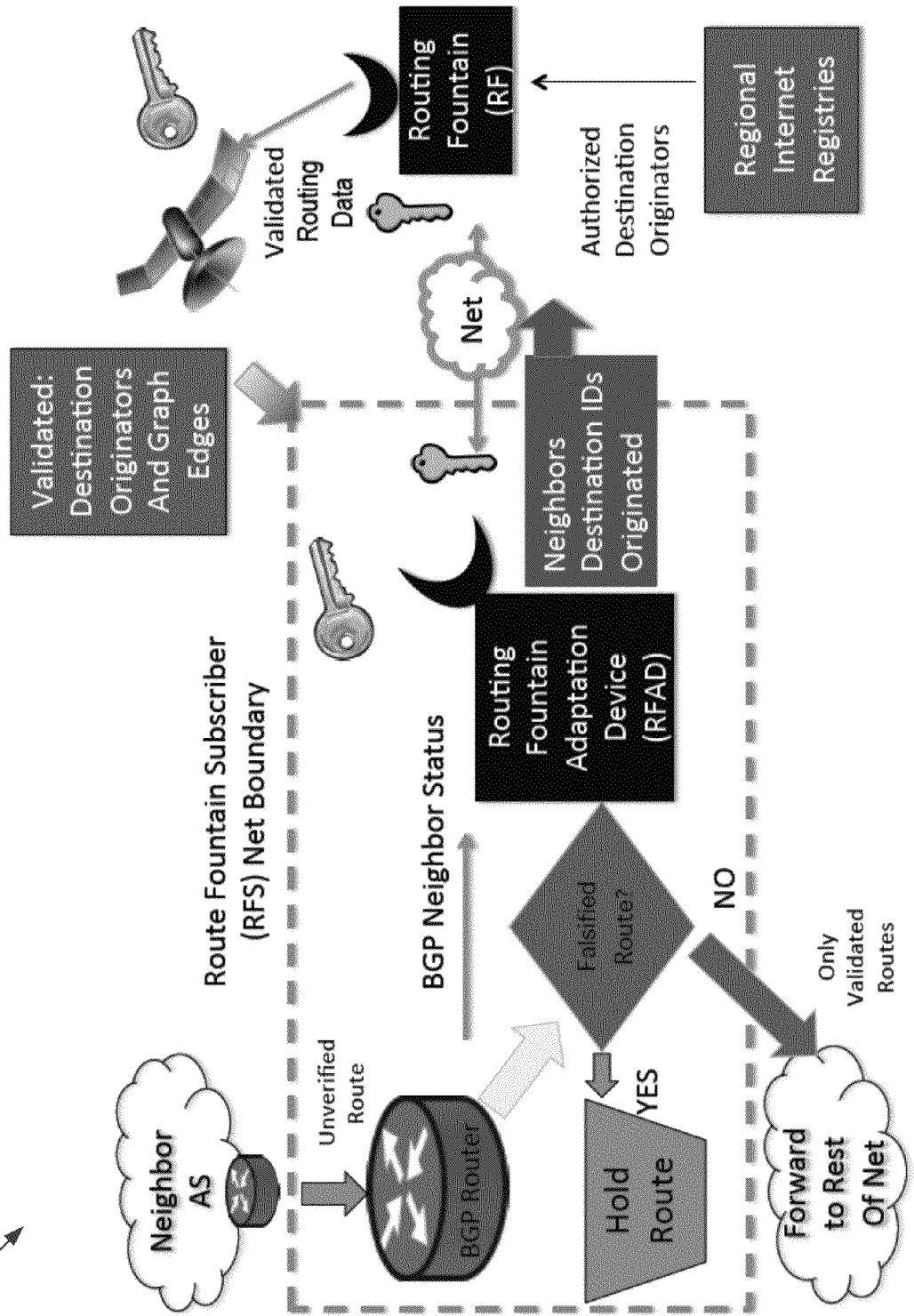
FIG. 18 illustrates a secure routing architecture with the use of a RF and RFS nodes, according to an embodiment of the present invention.

FIG. 18 illustrates a secure routing architecture 1800 with the use of a RF and RFS nodes, according to an embodiment of the present invention. The RF receives neighbor information and destination origination information from a RFS node. The RF additionally receives information from RIRs validating the authorization of the RFS node to originate that destination ID. The RF then broadcasts validated route origins and corroborated neighbor edges via the RDC. Routers of RFS nodes utilize this information to determine whether to forward the routing message or to hold it until its legitimacy can be verified.

The RF architecture may provide an alternative framework for securing routing infrastructure by providing an infrastructure with a scalable distribution control data dissemination that can be utilized to distribute information to secure routing exchanges. The main procedure for utilizing the RF architecture may consist of utilizing one or more RFs that are identified and described in more detail above to gather routing security-related information from the participant networks and transmit the gathered information back to the larger network. The basic operating procedure is that each network utilizing this architecture becomes a RFS node, collects routing information from the routers/routing processes local to that organization's network, and forwards that peering information to the RF. The RF, in turn, verifies the identification of the RFS nodes, validates the authorization of that organization by checking with routing registries or other relevant databases, and then redistributes the authorization to the rest of the network on a broadcast channel. Networks can listen to the broadcast channel and store this information, forming a local database of information that is utilized to validate the routing information from other routers.

When these organizations receive a routing announcement from a neighboring organization, they validate the routing announcement with the information received from the RF. If the routing information is valid, the routing information is processed through normal BGP routing and retransmitted to neighboring routers. If the routing information is identified as being suspect, the information is held until the data can be verified.

Requirements for Secure Routing

In order to perform secure routing, four basic functions should occur:

Verify the Identity of Organizations: A foundational operation for securing the routing structure is to have a mechanism for verifying the identity of an organization.

Verify the Authorization of Routing Participants: An informed decision should be made regarding whether an organization is authorized to announce this particular set of the address space. In the IP world, networked organizations are explicitly allocated address space that they are allowed to utilize for their consumption.

Ensure the Integrity of Routing Information: It is critical to ensure that the information has not been maliciously tampered or fictitiously modified.

Verify Neighboring Relationships: Route peering relationships between the participants should be verified so that a single malicious actor cannot unilaterally modify the path information for his or her malicious purposes.

RF-Enabled Routing Security Mechanisms

The basic mechanism for utilizing the RF for securing routing information is to utilize a broadcast channel to distribute the information required to perform these tasks so that the nodes can utilize this information in their localized routing decisions. Networks that subscribe to and participate in this methodology are referred to as RFS nodes. When an RFS node makes a routing announcement to the rest of the network through BGP or another protocol, the RFS node generates a message describing the contents of the message that will be sent to its neighbors and sends that message to the RF. The RF performs a verification of the legitimacy of this information and then redistributes this information simultaneously to each RFS node, which stores this information in a local database. Each RFS node has the responsibility of informing the RF of any time its neighboring relationships change or it reallocates/transfers its destination identifiers to another organization. When these events occur, the RF also redistributes this information back to the network.

The information that is distributed from the RF forms two key pieces of information that are utilized for routing security: a route authorization table and a routing graph. The route authorization table consists of a set of tuples 〈 destinationid, nodeid〉. This table serves as the local authorization information describing which routers are authorized. Similarly, the RF serves as the distribution point for a list of edges describing the connected network G. In this way, each x∈RFS has a local stored logical representation of the connectivity information between these nodes and can therefore utilize this information to identify paths with fabricated edges.

Equipped with both of these pieces of information, local networks are now able to better inform the decision processes of the local routing processes when they receive routing announcements from neighboring organizations. This interaction happens in two primary ways:

Verify Source: The RFS node verifies that the originator of this message is indeed authorized to announce this address space. This done by checking the locally stored route authorization database. If the database does not positively confirm this information, the local router is configured to ignore the message. If the database does positively confirm the information, then the local RAD proceeds to verify the path.

Check Path: The route path is checked against the local graph G. This is done by comparing each pair of AS nodes in P to ensure that there is a corresponding edge in G. If any edge in the path is not confirmed as a possible edge in the locally stored graph G, the routing message is ignored and the message is not propagated any further.

Authentication and Message Integrity Verification

Networks that are utilizing the RF architecture are equipped with an adaptation device called a RFAD that is further above. Each RFAD is uniquely associated with the networked organization that it represents, and this process occurs during the enrollment in the subscription of the service to the RF. In this initial setup process, the authenticity of the organization can be verified through demonstrating paperwork identifying the organization and a vetting process confirming that the representative is authorized to speak for the organization.

Upon establishing the RF-RFS relationship, a pair of keys are generated for this RFS node that can be utilized to verify the identity of the announcements generated by that RFS node. Messages sent from the RFS node to the RF would be encrypted with the RFS node private key $K_{RFS,P}$ and decrypted by the RF with the corresponding public key $K_{RFS,U}$. The RFS-to-RF communication may initially perform a Diffie-Helman key exchange, agree upon a session key, and establish a secure channel between the RFS node and the RF.

Information sent from the RF to the RDC would similarly be encrypted utilizing the RF's private key $K_{RF,P}$, which can only be correctly interpreted through the use of the its public key $K_{RF,U}$ by the corresponding RFS node. This key would be configured in the RFAD and as part of the initial service establishment.

The additional benefit to utilizing the PKI-based keying mechanisms is that they can also be used to ensure the integrity of the messages being delivered. Integrity can be verified through utilizing a hashing mechanism such as MD5, and encrypting the cryptographic hash with the use of the originator's private key. The message, once received, can then be hashed utilizing the same mechanism and the value of the message can then be compared to the original value to ensure it has not been tampered. This process provides a methodology to both provide the authentication and verify the integrity of the messages that are transmitted.

Distribution and Validation of Routing Information

The routers participating in the BGP routing exchanges ultimately should make the decision of how to process neighboring routing announcements. Therefore, the routers should interface with and access the distributed security information. In some embodiments, each local routing process can query its representative RFS node to determine the validity in terms of route authorization of a particular announcement. If the RFS node does not have this information, the RFS node can delay its response to the routing process, likewise delaying the amount of time it takes that router to make a decision of that announcement, or the RFS node could send back a response stating that it does not have the information to determine the legitimacy of the query.

The route authorization information delivered through the RF architecture generally comes from two conditions. If this is a new allocation of routes, the information should be delivered to the RF from the RIR once this allocation has been made. After the original allocation, an organization can reallocate a portion or all of its RIR-assigned address space to another organization. For example, if an organization is allocated a /16 address, the organization may want to lend/sell a /24 address to another organization. If a particular organization does this type of transaction, the organization should inform the RFs that this transaction was legitimate and the organization should explicitly tell the RFs that the transaction has occurred so that this information can be distributed to other RFS nodes such that the messages are not prevented from being retransmitted.

Each RFS node is generally required to notify the RF of any changes to its connections to neighboring routers—for example, if a new peering relationship is created or if a link goes down. In order to verify the validity of this announcement, the RF verifies that both networks related to this announcement confirm this relationship before transmitting this information to the rest of the network. For example, if node A announces an edge $\langle A, B \rangle$, the RF will wait to hear the message $\langle B, A \rangle$ before announcing the information to the rest of the network. This step provides a minimal logical corroboration of the truthfulness of the edge information prior to its distribution to the larger network.

Figure 19:
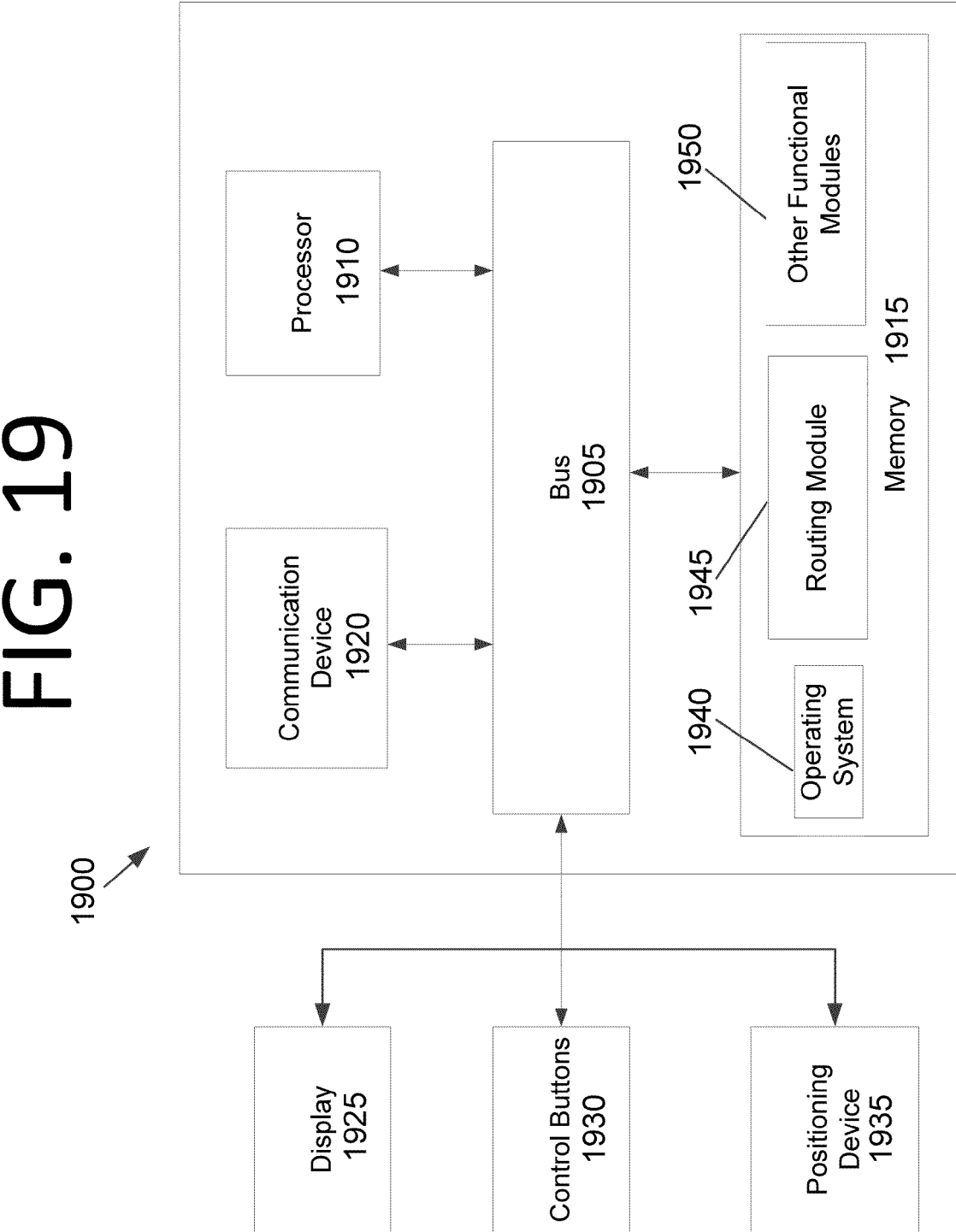
FIG. 19 illustrates a computing system for performing routing functions, according to an embodiment of the present invention.

FIG. 19 illustrates a computing system 1900 for performing routing functions, according to an embodiment of the present invention. In some embodiments, computing system 1900 may be a RF, a RFS node, or any other computing device. System 1900 includes a bus 1905 or other communication mechanism for communicating information, and a processor 1910 coupled to bus 1905 for processing information. Processor 1910 may be any type of general or specific purpose processor, including a central processing unit ("CPU") or application specific integrated circuit ("ASIC"). System 1900 further includes a memory 1915 for storing information and instructions to be executed by processor 1910. Memory 1915 can be comprised of any combination of random access memory ("RAM"), read only memory ("ROM"), flash memory, cache, static storage such as a magnetic or optical disk, or any other types of non-transitory computer-readable media or combinations thereof. Additionally, system 1900 includes a communication device 1920, such as a wireless network interface card, an antenna, or any combination thereof to provide access to one or more networks. Communication device 1900 may be capable of receiving both broadcast and non-broadcast transmissions.

Non-transitory computer-readable media may be any available media that can be accessed by processor 1910 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor 1910 is further coupled via bus 1905 to a display 1925, such as a Liquid Crystal Display ("LCD"), for displaying information to a user. A keyboard 1930 and a cursor control device 1935, such as a computer mouse, are further coupled to bus 1905 to enable a user to interface with system 1900.

In one embodiment, memory 1915 stores software modules that provide functionality when executed by processor 1910. The modules include an operating system 1940 for system 1900. The modules further include a routing module 1945 that is configured to perform the routing functions of system 1900. System 1900 may include one or more additional functional modules 1950 that include additional functionality.

One skilled in the art will appreciate that a "system" could be embodied as a personal computer, a server, a console, a PDA, a cell phone, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory ("RAM"), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

As discussed previously, some embodiments of the present invention pertain to a broadcast-based system for distributing routing information. A RF collects routing data from one or more RFS nodes from one or more networks. The RF then sends this data to broadcast equipment such as a satellite. The broadcast equipment then transmits the routing data via a RDC to the one or more RFS nodes, which have broadcast receiving equipment such as an antenna to receive the broadcast signal with the routing updates. In some embodiments, RFS nodes may only be capable of receiving broadcast data.

Also, in some embodiments, the RF may be located concurrently with the broadcast equipment, or be an integrated part of the broadcast equipment.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A system, comprising:
   a routing fountain ("RF") configured to receive routing information updates, wherein the routing information updates comprise network addressing information, changes to a routing structure of a network, or general information regarding the network;
   one or more routing fountain subscriber ("RFS") nodes configured to send routing information updates to the RF and receive unidirectional routing information updates from a routing distribution channel ("RDC"); and
   broadcast equipment configured to receive unidirectional routing information updates from the RF and broadcast the received routing information updates to the one or more RFS nodes via the RDC.

2. The system of claim 1, wherein the routing information updates comprise one or more of changes to a structure of a route distribution graph representing the network, nodes that have been allocated destination identifiers, and information related to a quality of a connection between two nodes.

3. The system of claim 2, wherein the changes to the structure of the route distribution graph comprise one or more of an insertion of an edge between two nodes, a removal of an edge between two nodes, an insertion of a node, a removal of a node, an announcement of a new destination identifier, and a retraction of a destination identifier.

4. The system of claim 1, wherein the RFS node comprises a routing fountain adaptation device configured to interface between routing devices in the network and the RF, and to receive routing information updates from the RF via the RDC.

5. The system of claim 1, wherein the RF is in a peering relationship as a parent or child of another RF.

6. The system of claim 1, wherein only a subset of nodes in the network are RFS nodes.

7. The system of claim 6, wherein the one or more RFS nodes are configured to receive enable or contain messages via the RDC and distribute the messages to adjacent non-RFS nodes or utilize information from the received messages to prevent propagation of malicious information to adjacent nodes.

8. The system of claim 7, wherein the one or more RFS nodes of the network are selected based on a respective node degree, path betweenness, or eigenvalue centrality.

9. The system of claim 7, wherein the one or more RFS nodes of the network are selected randomly.

10. The system of claim 1, wherein the system is configured to augment an existing routing infrastructure with additional infrastructure to improve performance.

11. The system of claim 1, wherein when the system interfaces with Border Gateway Protocol ("BGP") implementations, when current full path information is not known, the system is configured to use previously learned graph information to generate full path information for BGP messages.

12. The system of claim 1, wherein the RF and RFS are configured to form a local database of information that is utilized to validate routing information from other routers.

13. A computer-implemented method, comprising:
receiving, by a routing fountain ("RF"), routing information updates from one or more routing fountain subscriber ("RFS") nodes; and
transmitting, by the RF, the routing information updates to broadcast equipment, the transmission of the routing information updates from the RF to the broadcast equipment being unidirectional, wherein
the broadcast equipment is configured to broadcast the routing information updates to the one or more RFS nodes via a routing distribution channel ("RDC"), the transmission of the routing information updates from the broadcast equipment to the one or more RFS nodes being unidirectional.

14. The computer-implemented method of claim 13, further comprising:
queuing, by the RF, one or more messages from the one or more RFS nodes when a number of updates received at the RF exceeds the capacity of the RF.

15. The computer-implemented method of claim 13, further comprising:
authenticating, by the RF, the one or more RFS nodes associated with a message;
determining, by the RF, whether the one or more RFS nodes are authorized to distribute the message; and
checking, by the RF, data integrity of the message.

16. The computer-implemented method of claim 13, further comprising:
retransmitting, by the RF, graph information to the broadcast equipment to be rebroadcast to the one or more RFS nodes when the broadcast equipment is idle and has extra capacity.

17. The computer-implemented method of claim 13, wherein the routing information updates received by the RF comprise one or more of active neighbor information, and respective active routes originating from the one or more RFS nodes.

18. The computer-implemented method of claim 13, further comprising:
transmitting, by the RF, keep-alive messages to the one or more RFS nodes; and
transmitting a notification to the broadcast equipment, by the RF, when at least one of the one or more RFS nodes do not respond to a keep-alive message within a predetermined period of time.

19. The computer-implemented method of claim 13, wherein the RF is configured to augment an existing routing infrastructure with additional infrastructure to improve performance.

20. The computer-implemented method of claim 13, further comprising:
forming a local database of information that is utilized to validate routing information from other routers.

21. The computer-implemented method of claim 13, wherein the one or more RFS nodes comprise a mobile node ("MN").

22. The computer-implemented method of claim 21, further comprising:
initiating a transition from a first gateway network to a second gateway network upon detection of the second gateway network by the MN.

23. The computer-implemented method of claim 22, wherein the initiating of the transition further comprises:
communicating, by the MN, an intent to transition to an attachment point of the second gateway network;
establishing a connection between the MN and the second gateway network;
communicating the connection between the MN and the second gateway network to the RF; and
disconnecting the connection between the MN and the first gateway network.

24. An apparatus, comprising:
memory storing computer program instructions;
one or more processors configured to execute the computer program instructions stored in the memory;
a transmitter; and
a receiver configured to receive communications via a broadcast channel, wherein
the one or more processors are configured to:
receive routing update information from one or more routers in a network,
transmit the routing update information, via the transmitter, to a routing fountain ("RF"),
receive, via the receiver, unidirectional routing updates from broadcast equipment via the broadcast channel, and
store the routing information to transmit back to other networking equipment.

25. The apparatus of claim 24, wherein the one or more processors are further configured to transmit, via the transmitter, a notification that previously distributed information is no longer valid.

26. The apparatus of claim 24, wherein the one or more processors are further configured to interface between routing devices in the network and the RF, and to receive routing information updates from the RF via the broadcast channel.

27. The apparatus of claim 24, wherein the one or more processors are further configured to receive enable messages via the broadcast channel and distribute the messages to adjacent non-routing fountain subscriber ("RFS") nodes.

28. The apparatus of claim 24, wherein the one or more processors are further configured to receive contain messages via the broadcast channel to prevent spreading of fictitious information to neighboring nodes.

29. The apparatus of claim 24, wherein the routing update information comprises one or more of active neighbor information, active routes, authorized users of addresses, and link quality information that the apparatus is originating.

30. The apparatus of claim 24, wherein the one or more processors are further configured to delete a graph and insert in its place routing information based on the routing updates received via the broadcast channel and store the routing information in memory.

31. The apparatus of claim 24, wherein the apparatus is configured to augment an existing routing infrastructure with additional infrastructure to improve performance.

32. The apparatus of claim 24, wherein the apparatus is further configured to form a local database of information that is utilized to validate routing information from other routers.

33. The apparatus of claim 24, wherein when the apparatus is configured to interface with Border Gateway Protocol ("BGP") implementations, the apparatus is further configured to generate full path information for BGP messages by using previously learned graph information when current full path information is not known.

* * * * *